(12) United States Patent
Shim et al.

(10) Patent No.: US 10,303,520 B2
(45) Date of Patent: May 28, 2019

(54) METHOD AND APPARATUS FOR MIGRATING VIRTUAL MACHINE FOR IMPROVING MOBILE USER EXPERIENCE

(71) Applicant: SAMSUNG ELECTRONICS CO., LTD., Suwon-si (KR)

(72) Inventors: Hyo-taek Shim, Seongnam-si (KR); Jong-ryool Kim, Suwon-si (KR); Hyung-jin Lim, Redwood City, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/514,924

(22) PCT Filed: Sep. 11, 2015

(86) PCT No.: PCT/KR2015/009566
§ 371 (c)(1),
(2) Date: Mar. 28, 2017

(87) PCT Pub. No.: WO2016/056760
PCT Pub. Date: Apr. 14, 2016

(65) Prior Publication Data
US 2017/0220394 A1 Aug. 3, 2017

(30) Foreign Application Priority Data
Oct. 10, 2014 (KR) .................. 10-2014-0136963

(51) Int. Cl.
*G06F 9/455* (2018.01)
*G06F 9/50* (2006.01)
(Continued)

(52) U.S. Cl.
CPC ........ *G06F 9/5077* (2013.01); *G06F 9/45558* (2013.01); *G06F 9/4856* (2013.01);
(Continued)

(58) Field of Classification Search
None
See application file for complete search history.

(56) References Cited

U.S. PATENT DOCUMENTS

| 8,468,230 B2 | 6/2013 | Murata |
| 2010/0050172 A1 | 2/2010 | Ferris |

(Continued)

FOREIGN PATENT DOCUMENTS

| CN | 103617077 A | 3/2014 |
| EP | 2575044 A1 | 4/2013 |

(Continued)

OTHER PUBLICATIONS

International Search Report (PCT/ISA/210) dated Mar. 18, 2016 issued by the International Searching Authority in counterpart International Application No. PCT/KR2015/009566.
(Continued)

Primary Examiner — Dong U Kim
(74) Attorney, Agent, or Firm — Sughrue Mion, PLLC

(57) ABSTRACT

Provided is a cloud control server that controls a plurality of cloud servers, the cloud control server including a communication unit configured to transmit, to a mobile device, information about one or more cloud servers from among the plurality of cloud servers, and to receive, from the mobile device, identification information of a cloud server that is selected by a user of the mobile device and is from among the one or more cloud servers; and a controller configured to migrate a virtual machine of the mobile device to the selected cloud server from a cloud server in which the virtual machine of the mobile device is located and that is from among the plurality of cloud servers, wherein the virtual machine of the mobile device executes an application that is output from the mobile device.

14 Claims, 23 Drawing Sheets

(51) Int. Cl.
  *G06F 9/48* (2006.01)
  *G06F 15/16* (2006.01)
  *H04L 29/08* (2006.01)
  *H04W 88/16* (2009.01)

(52) U.S. Cl.
  CPC .......... *G06F 9/5044* (2013.01); *G06F 9/5088* (2013.01); *G06F 15/16* (2013.01); *H04L 29/08* (2013.01); *H04L 67/10* (2013.01); *H04W 88/16* (2013.01); *G06F 2009/4557* (2013.01)

(56) References Cited

U.S. PATENT DOCUMENTS

| | | | | |
|---|---|---|---|---|
| 2012/0023223 A1* | 1/2012 | Branch | ................ | G06F 9/4856 709/224 |
| 2012/0110462 A1* | 5/2012 | Eswaran | ................ | G06F 9/5072 715/736 |
| 2012/0304191 A1 | 11/2012 | Morgan | | |
| 2013/0073670 A1* | 3/2013 | Das | ........................ | G06F 9/5027 709/217 |
| 2013/0182605 A1* | 7/2013 | So | ........................ | H04W 40/00 370/254 |
| 2013/0336286 A1 | 12/2013 | Anschutz | | |
| 2014/0019970 A1 | 1/2014 | Okamoto | | |
| 2014/0258533 A1* | 9/2014 | Antony | ............. | H04L 29/08144 709/226 |
| 2014/0335817 A1* | 11/2014 | Hyde | .................. | H04W 40/246 455/406 |
| 2014/0380175 A1* | 12/2014 | Matczynski | ........ | H04L 41/5019 715/736 |
| 2015/0052528 A1* | 2/2015 | French | .................. | G06F 9/4856 718/1 |
| 2015/0131639 A1* | 5/2015 | Hirose | .................. | H04W 48/04 370/338 |

FOREIGN PATENT DOCUMENTS

| | | |
|---|---|---|
| JP | 5104588 B2 | 12/2012 |
| KR | 10-1165989 B1 | 7/2012 |
| WO | 2014/052271 A1 | 4/2014 |

OTHER PUBLICATIONS

Communication dated Oct. 13, 2017, issued by the European Patent Office in counterpart European Patent Application No. 15849228.0.

* cited by examiner

[Fig. 1a]
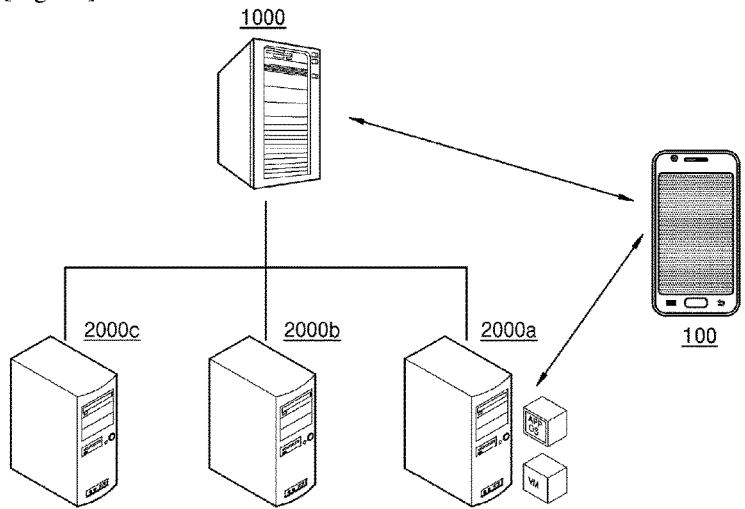
[Fig. 1b]
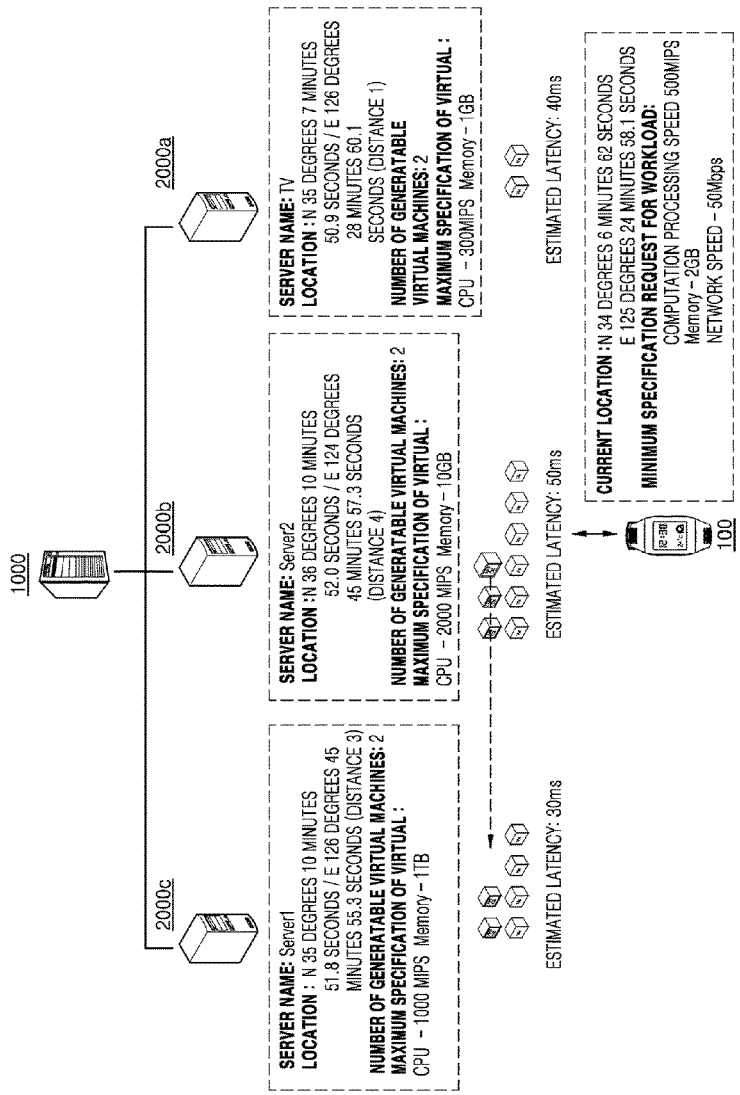

[Fig. 1c]
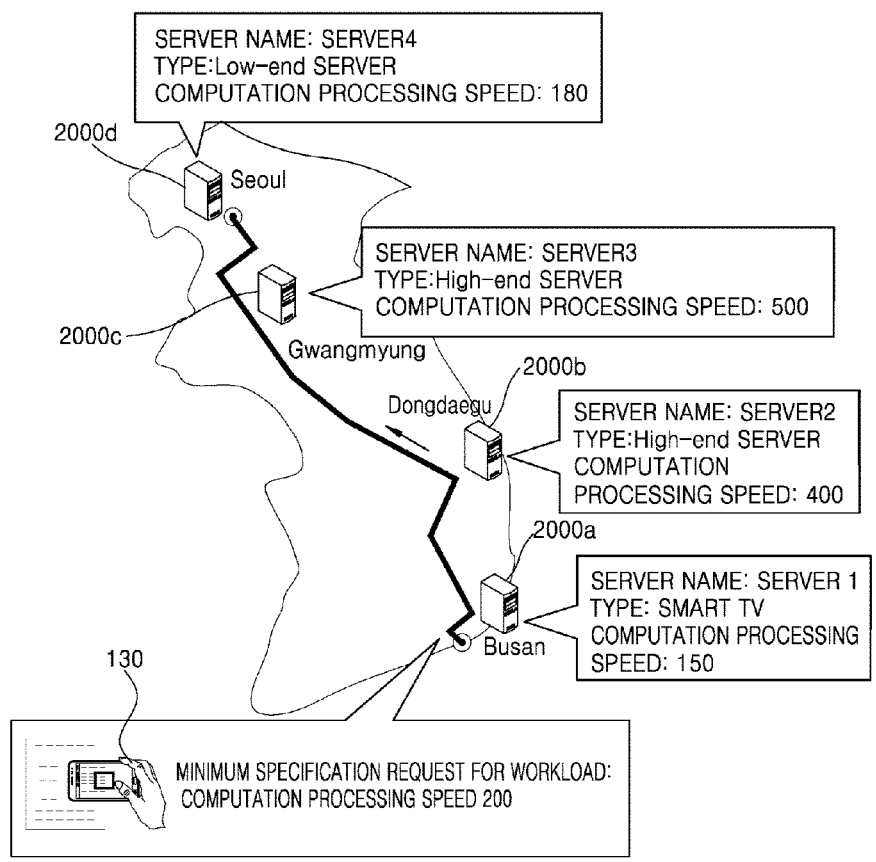

[Fig. 1d]
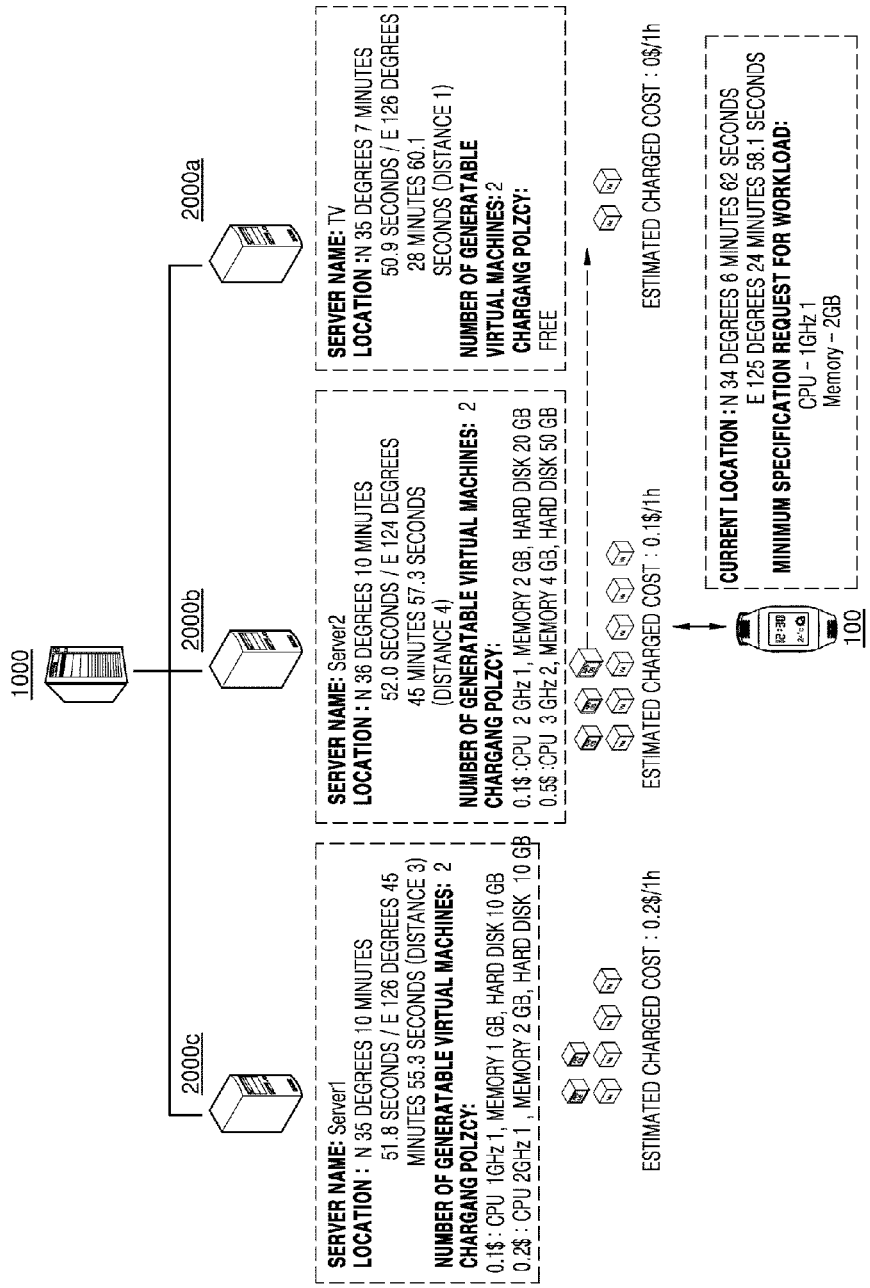

[Fig. 1e]
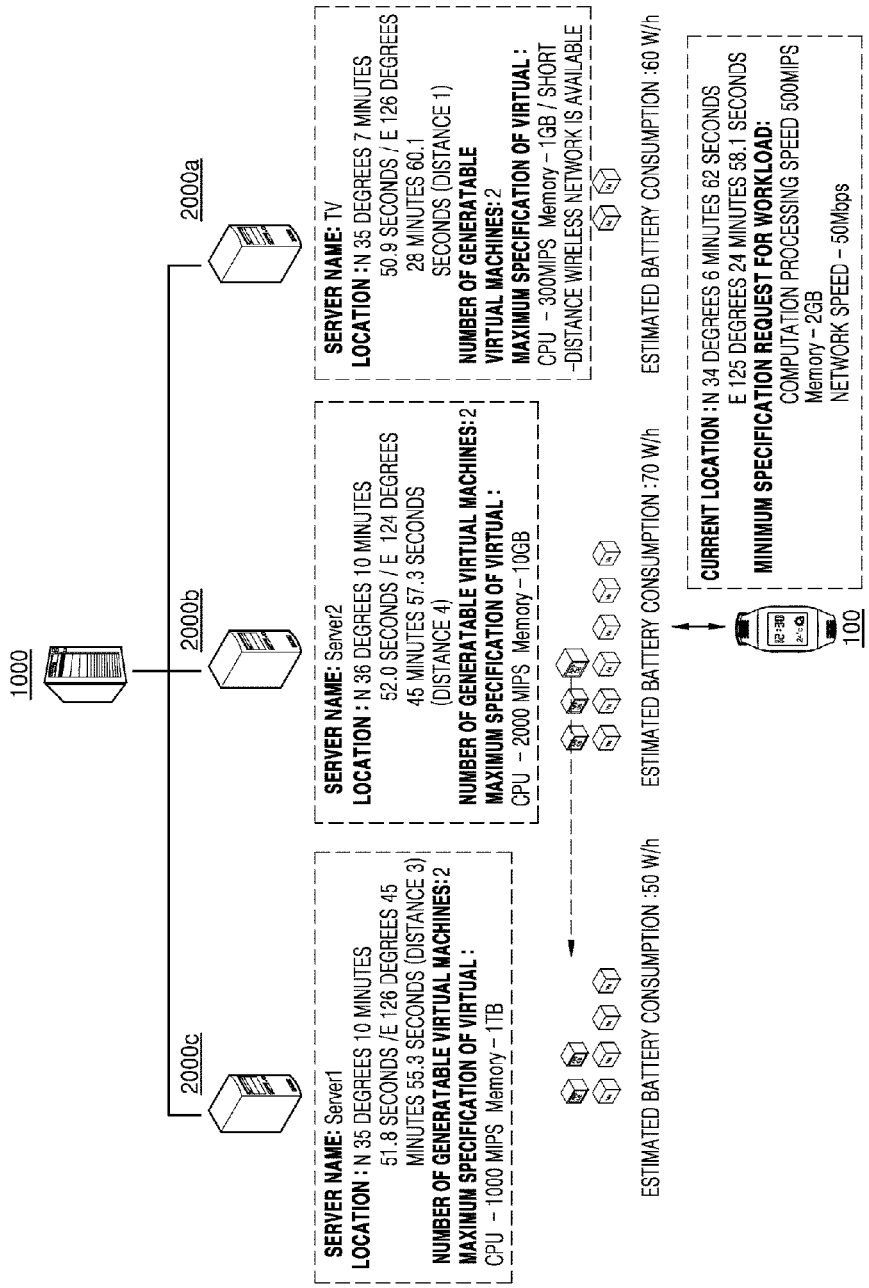

[Fig. 1f]
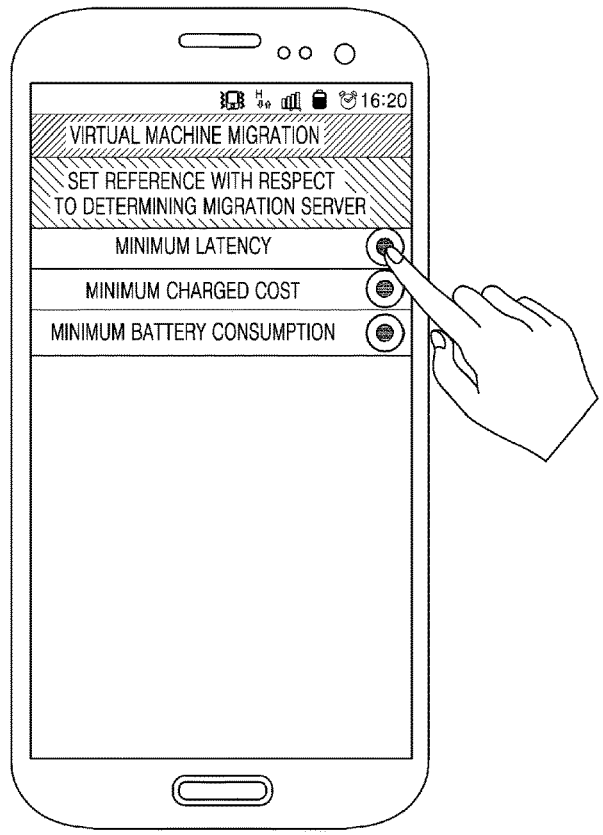
[Fig. 2]
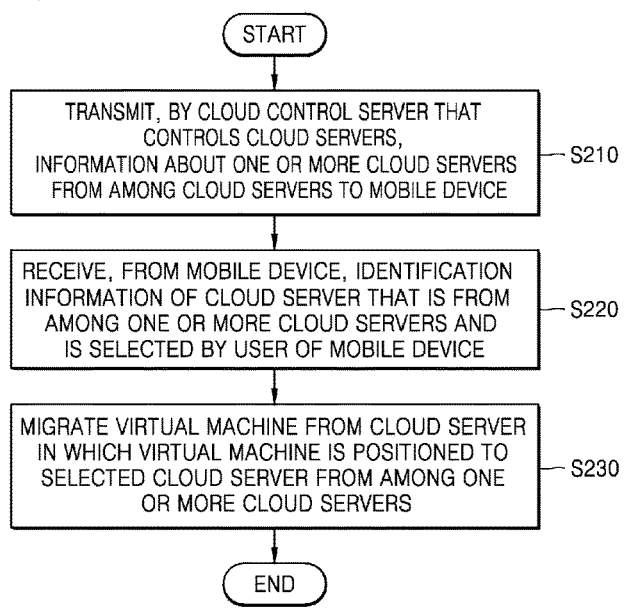

[Fig. 3]
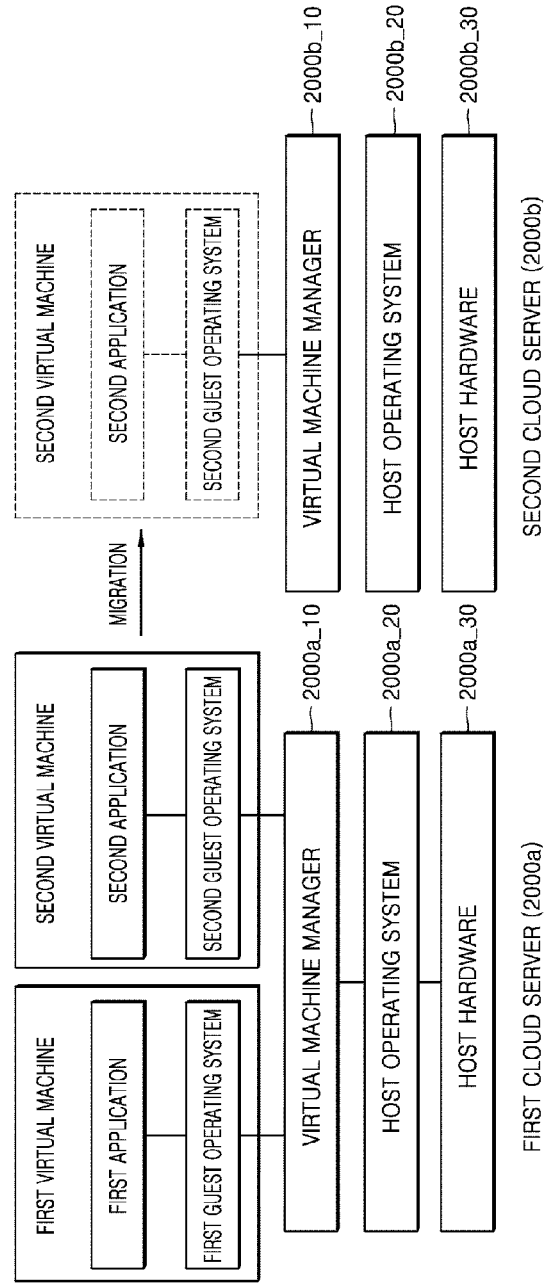

[Fig. 4]
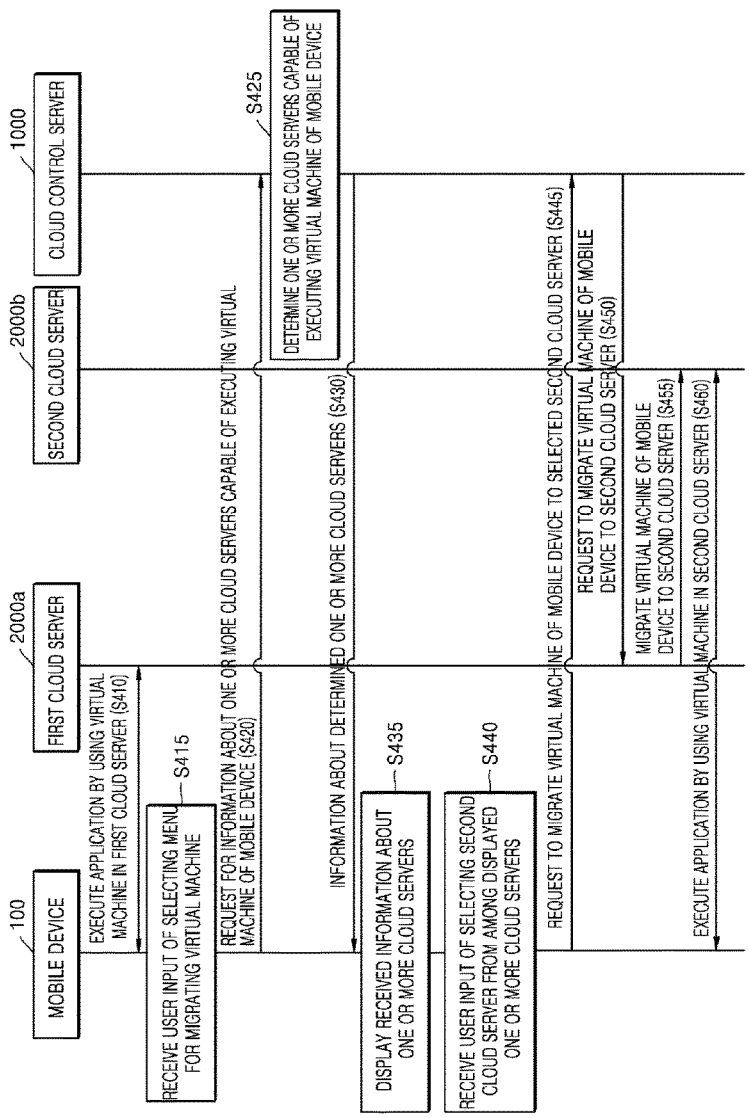
[Fig. 5]
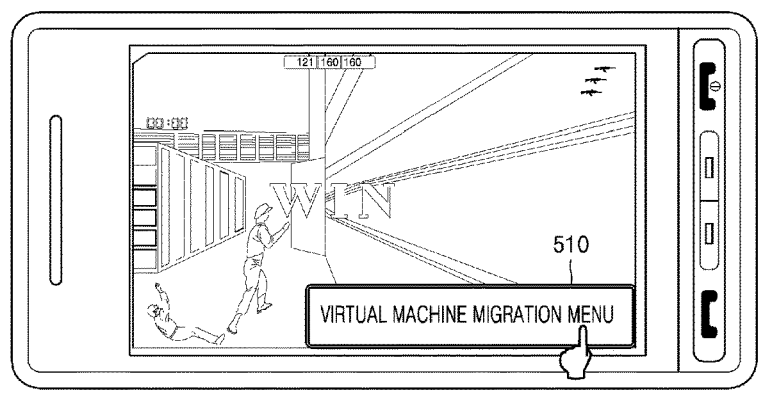

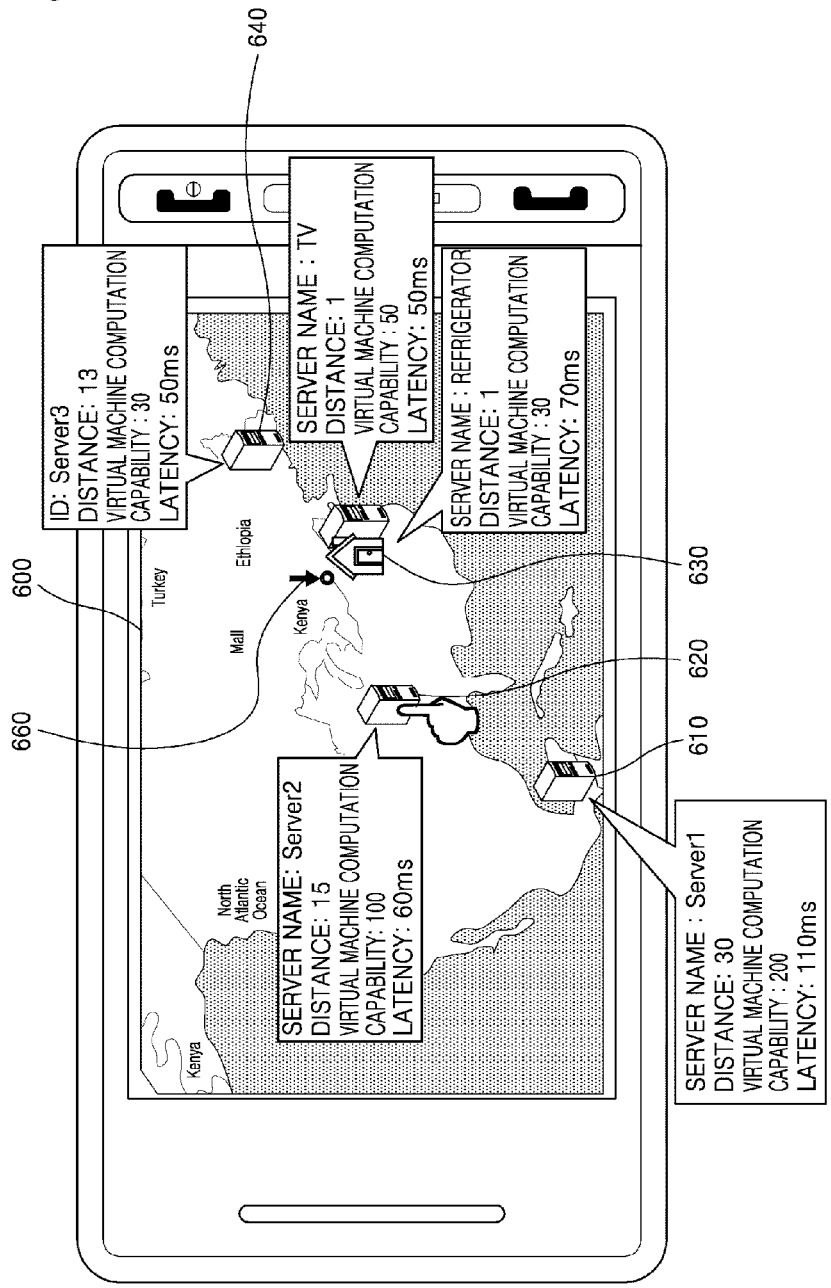
[Fig. 6a]

[Fig. 6b]
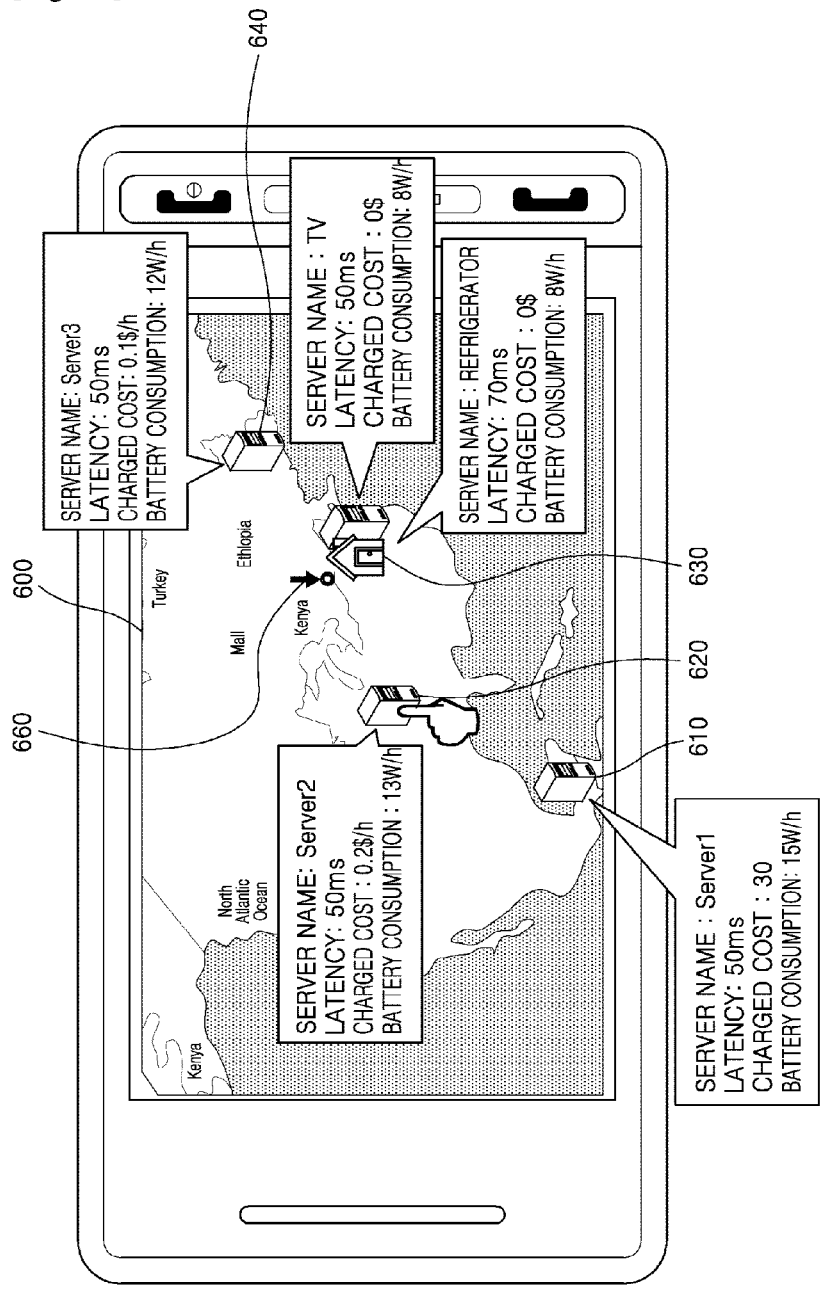

[Fig. 7]
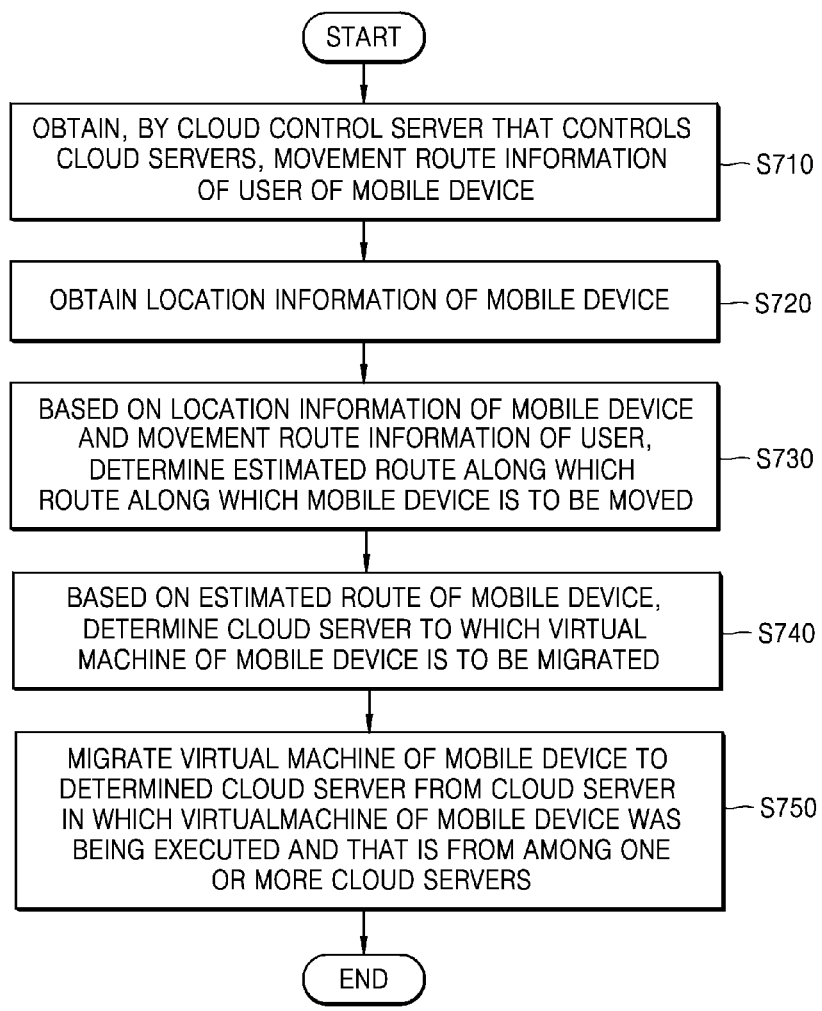

[Fig. 8]
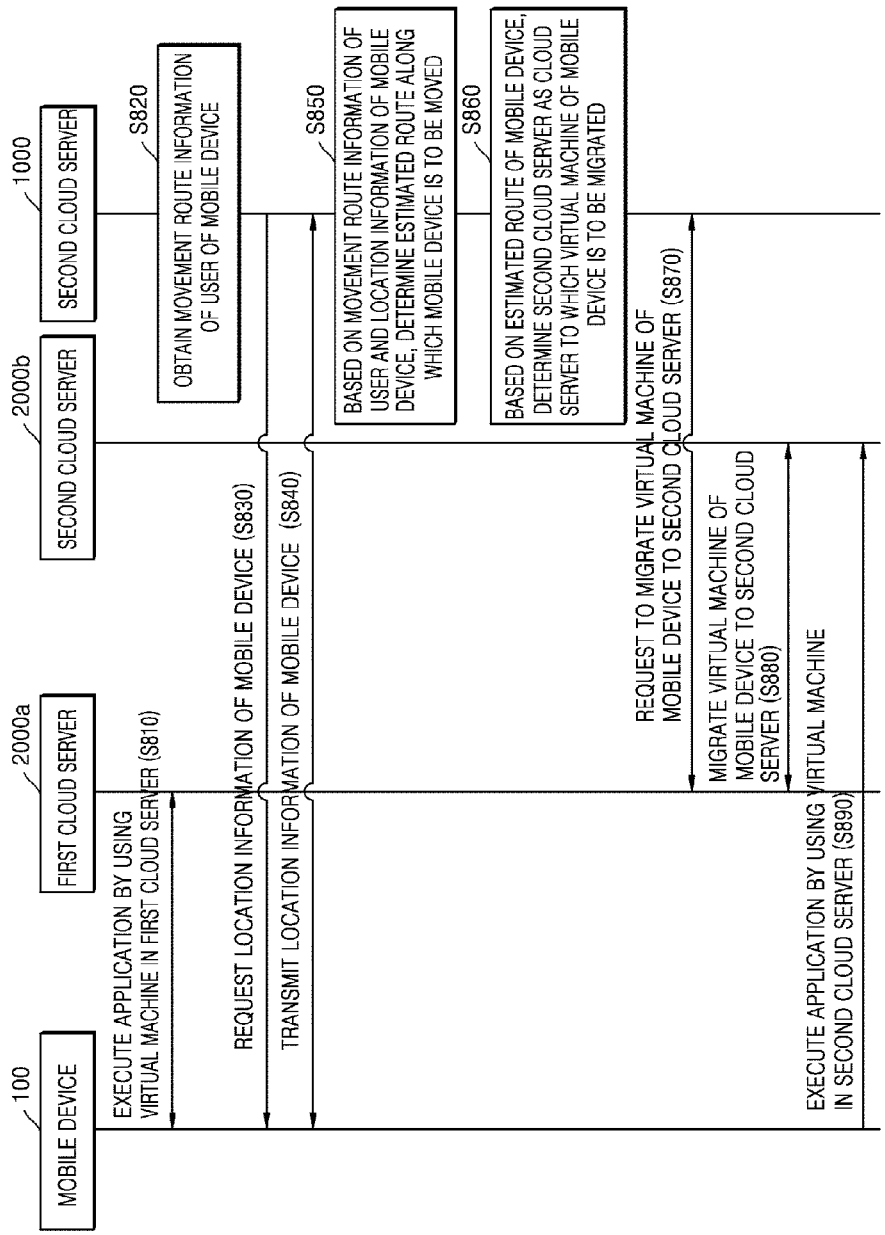

| TIME (910) | LATITUDES (920) | LONGITUPES (930) | SPEEDS (940) |
|---|---|---|---|
| PM 06:30 | N 35 DEGREES 7 MINUTES 50.6 SECONDS | E 126 DEGREES 28 MINUTES 55.0 SECONDS | 0Km/s |
| PM 06:40 | N 35 DEGREES 7 MINUTES 51.0 SECONDS | E 126 DEGREES 28 MINUTES 55.1 SECONDS | 60Km/s |
| PM 06:50 | N 35 DEGREES 7 MINUTES 51.5 SECONDS | E 126 DEGREES 28 MINUTES 55.2 SECONDS | 62Km/s |
| PM 07:00 | N 35 DEGREES 7 MINUTES 51.8 SECONDS | E 126 DEGREES 28 MINUTES 55.3 SECONDS | 0Km/s |
| PM 07:05 | N 35 DEGREES 7 MINUTES 51.9 SECONDS | E 126 DEGREES 28 MINUTES 55.3 SECONDS | 0Km/s |
| PM 07:10 | N 35 DEGREES 7 MINUTES 52.1 SECONDS | E 126 DEGREES 28 MINUTES 55.4 SECONDS | 100Km/s |
| PM 07:20 | N 35 DEGREES 7 MINUTES 52.1 SECONDS | E 126 DEGREES 28 MINUTES 56.2 SECONDS | 60Km/s |
| PM 07:30 | N 35 DEGREES 7 MINUTES 52.1 SECONDS | E 126 DEGREES 28 MINUTES 57.5 SECONDS | 0Km/s |
| PM 09:00 | N 35 DEGREES 7 MINUTES 52.1 SECONDS | E 126 DEGREES 28 MINUTES 57.5 SECONDS | 0Km/s |
| PM 09:10 | N 35 DEGREES 7 MINUTES 52.0 SECONDS | E 126 DEGREES 28 MINUTES 58.2 SECONDS | 60Km/s |
| PM 09:20 | N 35 DEGREES 7 MINUTES 52.0 SECONDS | E 126 DEGREES 28 MINUTES 58.9 SECONDS | 60Km/s |
| PM 09:30 | N 35 DEGREES 7 MINUTES 51.5 SECONDS | E 126 DEGREES 28 MINUTES 59.1 SECONDS | 60Km/s |
| PM 09:40 | N 35 DEGREES 7 MINUTES 51.7 SECONDS | E 126 DEGREES 28 MINUTES 59.5 SECONDS | 70Km/s |
| PM 09:50 | N 35 DEGREES 7 MINUTES 51.7 SECONDS | E 126 DEGREES 28 MINUTES 59.8 SECONDS | 80Km/s |
| PM 10:00 | N 35 DEGREES 7 MINUTES 51.9 SECONDS | E 126 DEGREES 28 MINUTES 60.1 SECONDS | 0Km/s |
| AM 07:30 | N 35 DEGREES 7 MINUTES 51.9 SECONDS | E 126 DEGREES 28 MINUTES 60.1 SECONDS | 0Km/s |

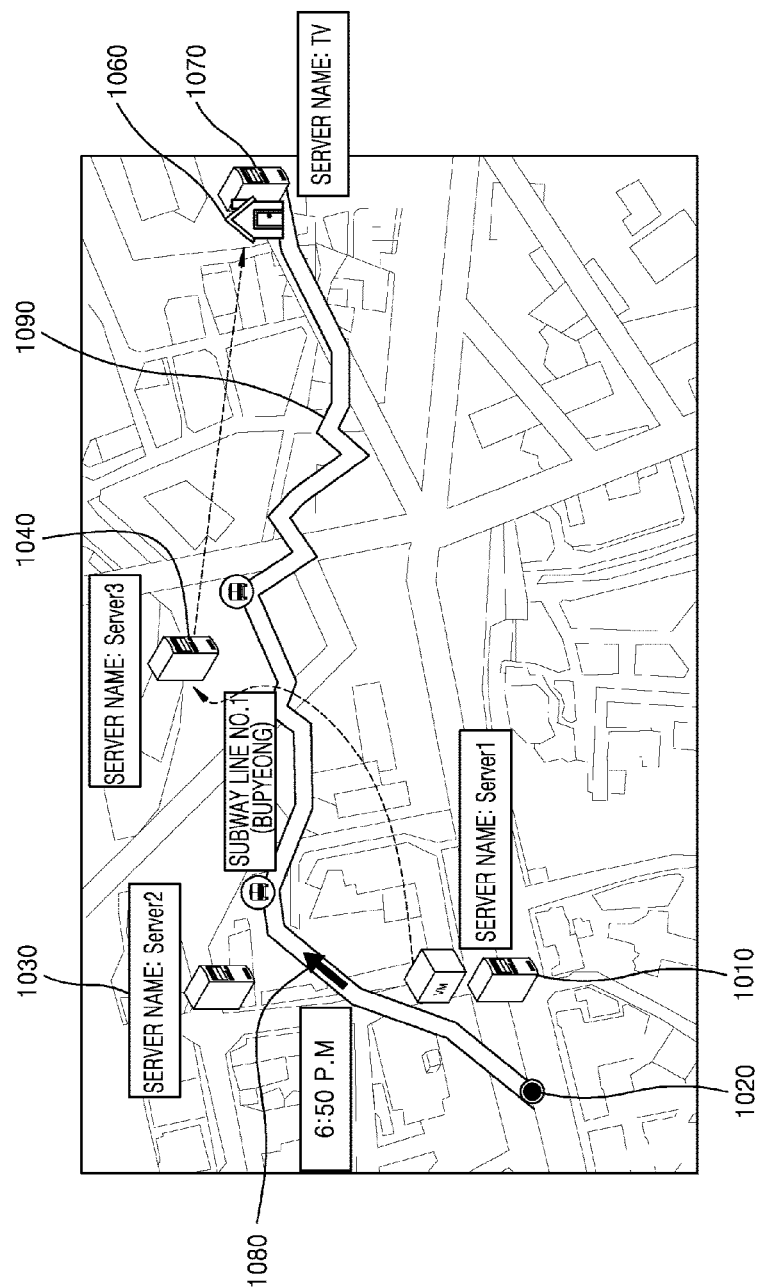
[Fig. 10]

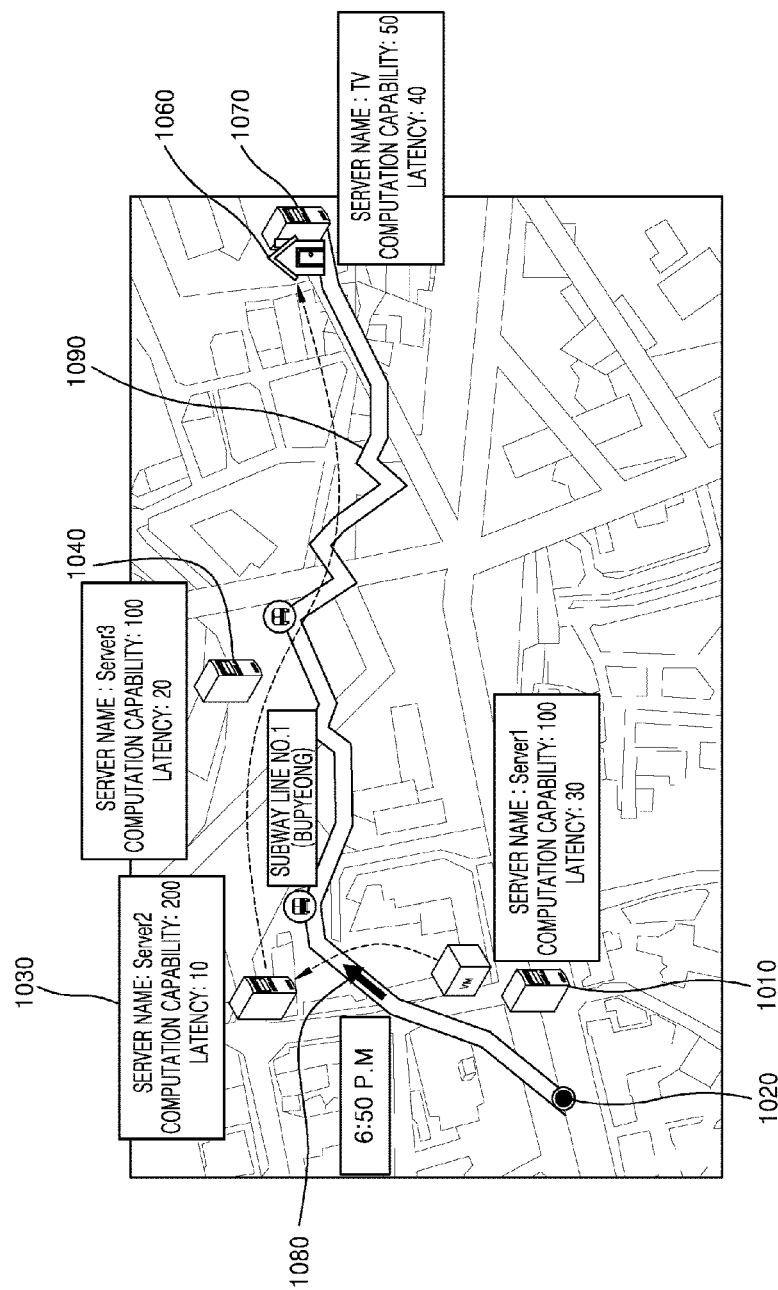
[Fig. 11]

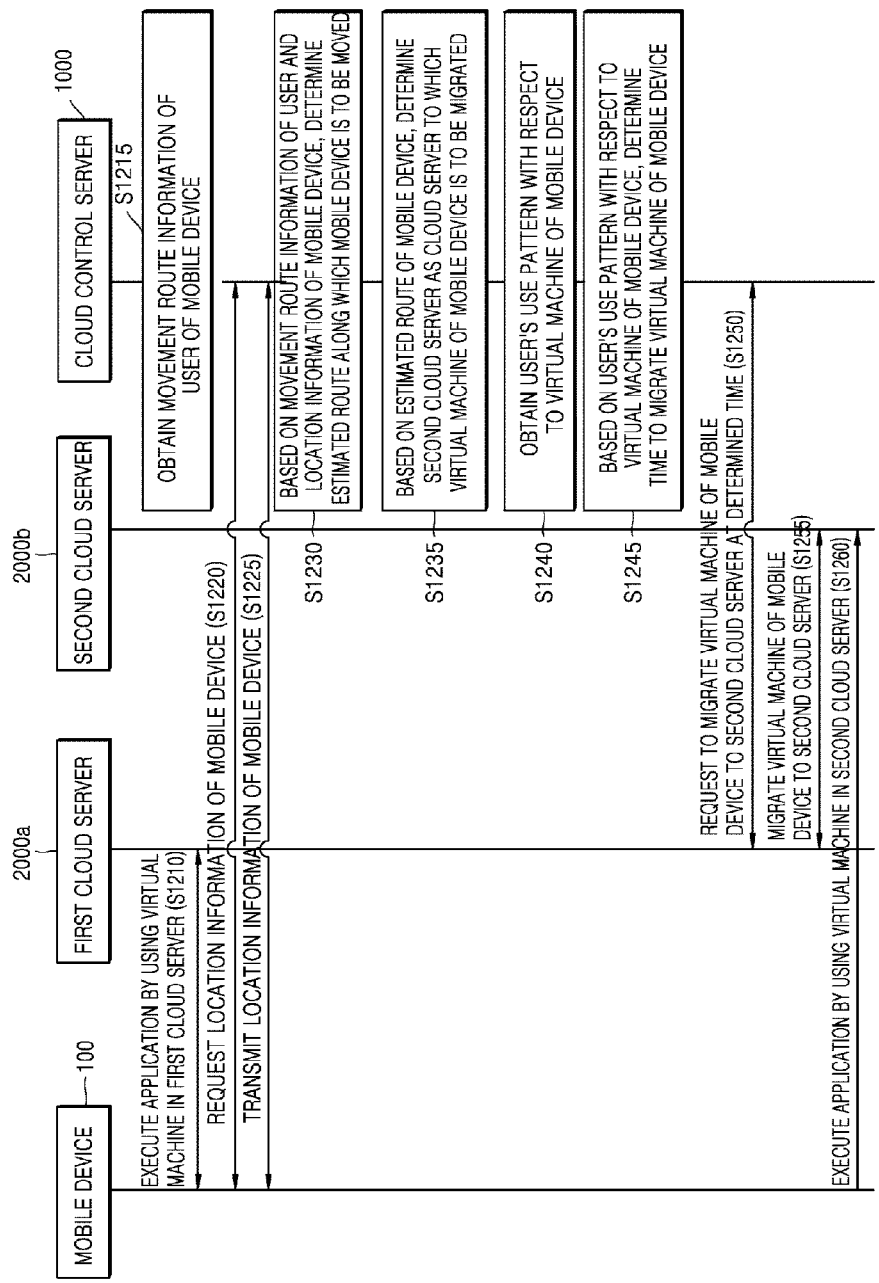
[Fig. 12]

[Fig. 13a]

| TIME | LATITUDES | LONGITUDES | SPEEDS | WHETHER VM ARE BEING USED |
|---|---|---|---|---|
| PM 06:30 | N 35 DEGREES 7 MINUTES 50.6 SECONDS | E 126 DEGREES 28 MINUTES 55.0 SECONDS | 0Km/s | NOT USED |
| PM 06:40 | N 35 DEGREES 7 MINUTES 51.5 SECONDS | E 126 DEGREES 28 MINUTES 55.1 SECONDS | 60Km/s | USED |
| PM 06:50 | N 35 DEGREES 7 MINUTES 51.8 SECONDS | E 126 DEGREES 28 MINUTES 55.2 SECONDS | 62Km/s | USED |
| PM 07:00 | N 35 DEGREES 7 MINUTES 51.9 SECONDS | E 126 DEGREES 28 MINUTES 55.3 SECONDS | 0Km/s | NOT USED |
| PM 07:05 | N 35 DEGREES 7 MINUTES 51.9 SECONDS | E 126 DEGREES 28 MINUTES 55.3 SECONDS | 0Km/s | NOT USED |
| PM 07:10 | N 35 DEGREES 7 MINUTES 52.1 SECONDS | E 126 DEGREES 28 MINUTES 57.5 SECONDS | 100Km/s | USED |
| PM 07:20 | N 35 DEGREES 7 MINUTES 52.1 SECONDS | E 126 DEGREES 28 MINUTES 57.5 SECONDS | 60Km/s | USED |
| PM 07:30 | N 35 DEGREES 7 MINUTES 52.1 SECONDS | E 126 DEGREES 28 MINUTES 57.5 SECONDS | 0Km/s | NOT USED |
| PM 09:00 | N 35 DEGREES 7 MINUTES 52.1 SECONDS | E 126 DEGREES 28 MINUTES 57.5 SECONDS | 0Km/s | NOT USED |
| PM 09:10 | N 35 DEGREES 7 MINUTES 52.0 SECONDS | E 126 DEGREES 28 MINUTES 58.9 SECONDS | 60Km/s | USED |
| PM 09:20 | N 35 DEGREES 7 MINUTES 52.0 SECONDS | E 126 DEGREES 28 MINUTES 58.9 SECONDS | 60Km/s | USED |
| PM 09:30 | N 35 DEGREES 7 MINUTES 51.5 SECONDS | E 126 DEGREES 28 MINUTES 59.1 SECONDS | 60Km/s | USED |
| PM 09:40 | N 35 DEGREES 7 MINUTES 51.7 SECONDS | E 126 DEGREES 28 MINUTES 59.5 SECONDS | 70Km/s | USED |
| PM 09:50 | N 35 DEGREES 7 MINUTES 51.7 SECONDS | E 126 DEGREES 28 MINUTES 59.8 SECONDS | 80Km/s | USED |
| PM 10:00 | N 35 DEGREES 7 MINUTES 51.9 SECONDS | E 126 DEGREES 28 MINUTES 60.1 SECONDS | 0Km/s | NOT USED |
| AM 07:30 | N 35 DEGREES 7 MINUTES 51.9 SECONDS | E 126 DEGREES 28 MINUTES 60.1 SECONDS | 0Km/s | NOT USED |

[Fig. 13b]
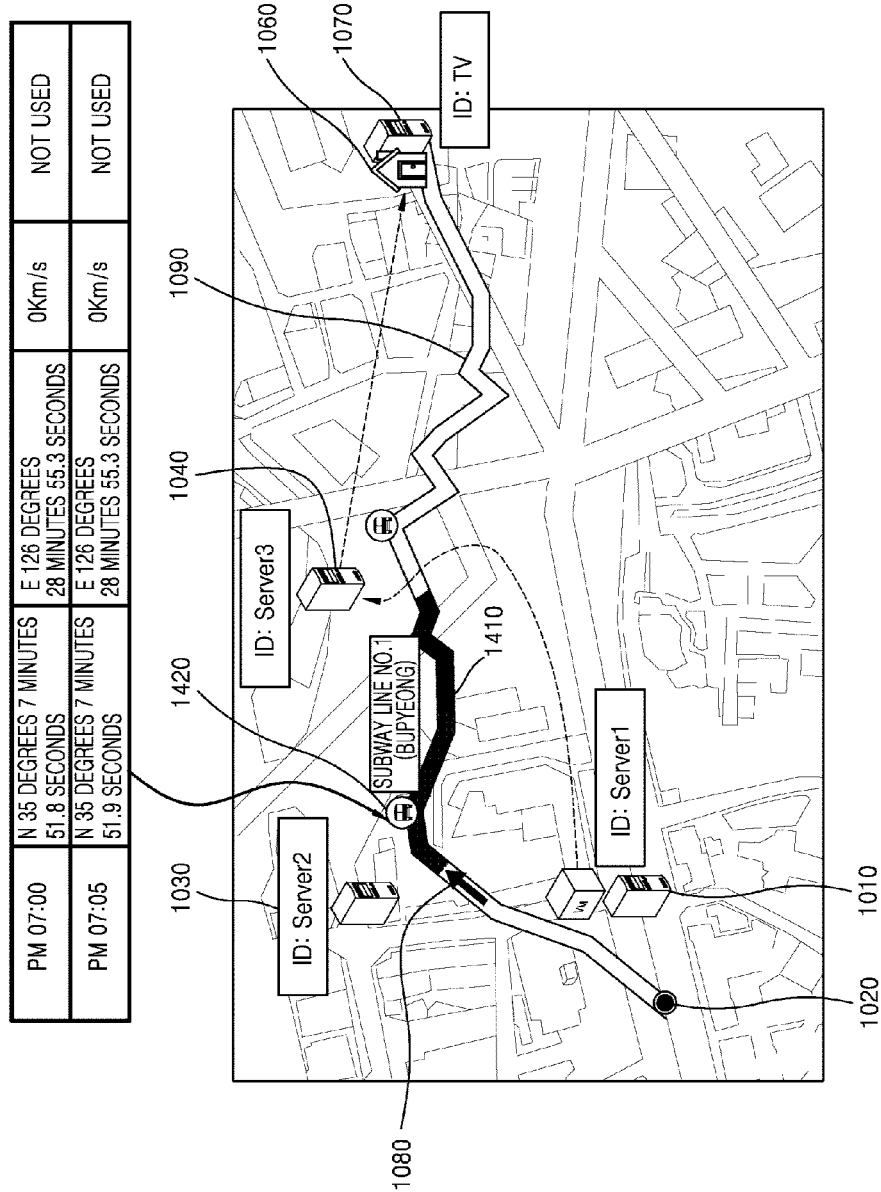

[Fig. 14a]

| TIME | LATITUDES 1 | LONGITUDES 1 | WHETHER VM ARE BEING USED | LOCATION 1 | LATITUDES 2 | LONGITUDES 1 | WHETHER VM ARE BEING USED | LOCATION 2 |
|---|---|---|---|---|---|---|---|---|
| AM 08:00 | N 35 DEGREES 7 MINUTES 50.6 SECONDS | E 126 DEGREES 28 MINUTES 55.0 SECONDS | NOT USED | HOME | N 35 DEGREES 7 MINUTES 50.6 SECONDS | E 126 DEGREES 28 MINUTES 55.0 SECONDS | NOT USED | HOME |
| AM 08:05 | N 35 DEGREES 7 MINUTES 51.0 SECONDS | E 126 DEGREES 28 MINUTES 55.1 SECONDS | USED | SUBWAY | N 35 DEGREES 7 MINUTES 50.4 SECONDS | E 126 DEGREES 28 MINUTES 55.1 SECONDS | NOT USED | ROAD |
| AM 08:10 | N 35 DEGREES 7 MINUTES 51.5 SECONDS | E 126 DEGREES 28 MINUTES 55.2 SECONDS | USED | SUBWAY | N 35 DEGREES 7 MINUTES 50.0 SECONDS | E 126 DEGREES 28 MINUTES 55.2 SECONDS | NOT USED | ROAD |
| AM 08:15 | N 35 DEGREES 7 MINUTES 51.8 SECONDS | E 126 DEGREES 28 MINUTES 55.3 SECONDS | NOT USED | SUBWAY STATION | N 35 DEGREES 7 MINUTES 49.9 SECONDS | E 126 DEGREES 28 MINUTES 55.3 SECONDS | NOT USED | ROAD |
| AM 08:20 | N 35 DEGREES 7 MINUTES 51.9 SECONDS | E 126 DEGREES 28 MINUTES 55.3 SECONDS | NOT USED | SUBWAY STATION | N 35 DEGREES 7 MINUTES 49.5 SECONDS | E 126 DEGREES 28 MINUTES 55.3 SECONDS | NOT USED | ROAD |
| AM 08:25 | N 35 DEGREES 7 MINUTES 52.1 SECONDS | E 126 DEGREES 28 MINUTES 55.4 SECONDS | USED | SUBWAY | N 35 DEGREES 7 MINUTES 49.5 SECONDS | E 126 DEGREES 28 MINUTES 55.4 SECONDS | NOT USED | ROAD |
| AM 08:30 | N 35 DEGREES 7 MINUTES 52.1 SECONDS | E 126 DEGREES 28 MINUTES 56.2 SECONDS | USED | SUBWAY | N 35 DEGREES 7 MINUTES 49.4 SECONDS | E 126 DEGREES 28 MINUTES 56.2 SECONDS | NOT USED | ROAD |
| AM 08:35 | N 35 DEGREES 7 MINUTES 52.1 SECONDS | E 126 DEGREES 28 MINUTES 57.5 SECONDS | USED | SUBWAY | N 35 DEGREES 7 MINUTES 49.0 SECONDS | E 126 DEGREES 28 MINUTES 57.5 SECONDS | NOT USED | ROAD |
| AM 08:40 | N 35 DEGREES 7 MINUTES 52.1 SECONDS | E 126 DEGREES 28 MINUTES 57.5 SECONDS | USED | SUBWAY | N 35 DEGREES 7 MINUTES 50.1 SECONDS | E 126 DEGREES 28 MINUTES 57.5 SECONDS | NOT USED | ROAD |
| AM 08:45 | N 35 DEGREES 7 MINUTES 52.0 SECONDS | E 126 DEGREES 28 MINUTES 58.2 SECONDS | USED | SUBWAY | N 35 DEGREES 7 MINUTES 50.0 SECONDS | E 126 DEGREES 28 MINUTES 58.2 SECONDS | NOT USED | ROAD |
| AM 08:50 | N 35 DEGREES 7 MINUTES 52.0 SECONDS | E 126 DEGREES 28 MINUTES 58.9 SECONDS | USED | SUBWAY | N 35 DEGREES 7 MINUTES 50.7 SECONDS | E 126 DEGREES 28 MINUTES 58.9 SECONDS | NOT USED | ROAD |
| AM 08:55 | N 35 DEGREES 7 MINUTES 51.5 SECONDS | E 126 DEGREES 28 MINUTES 59.1 SECONDS | USED | SUBWAY | N 35 DEGREES 7 MINUTES 51.5 SECONDS | E 126 DEGREES 28 MINUTES 59.1 SECONDS | NOT USED | ROAD |
| AM 09:00 | N 35 DEGREES 7 MINUTES 51.7 SECONDS | E 126 DEGREES 28 MINUTES 59.5 SECONDS | NOT USED | WORKPLACE | N 35 DEGREES 7 MINUTES 51.7 SECONDS | E 126 DEGREES 28 MINUTES 59.5 SECONDS | NOT USED | WORKPLACE |

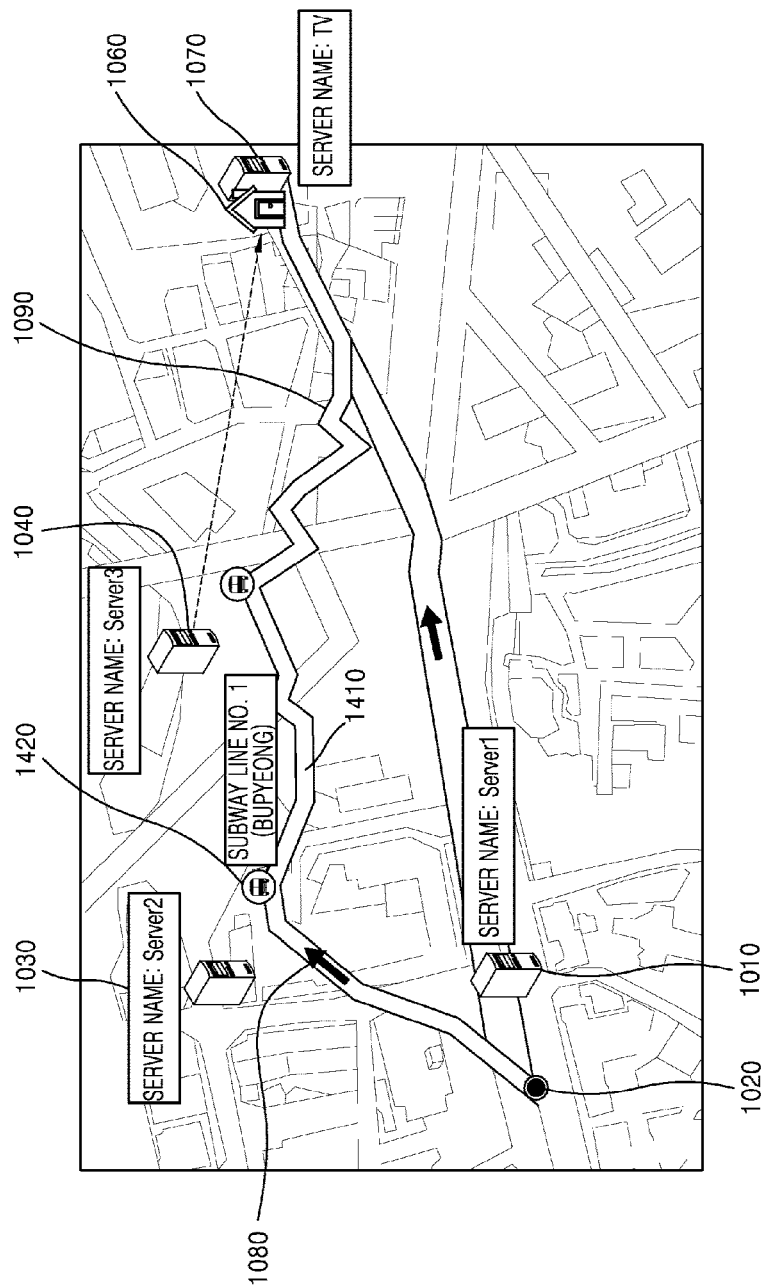
[Fig. 14b]

[Fig. 15]
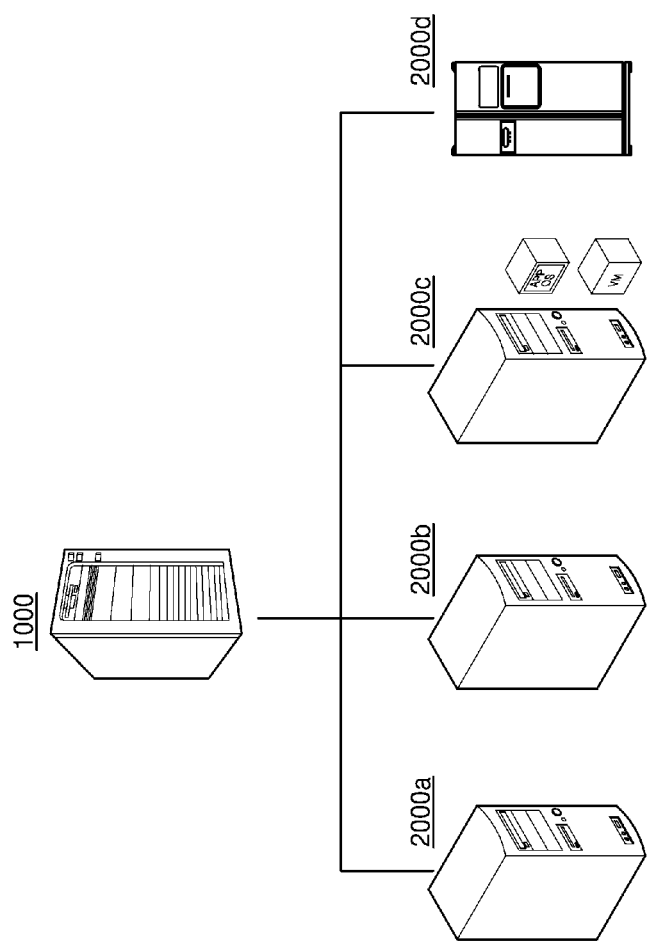

[Fig. 16]
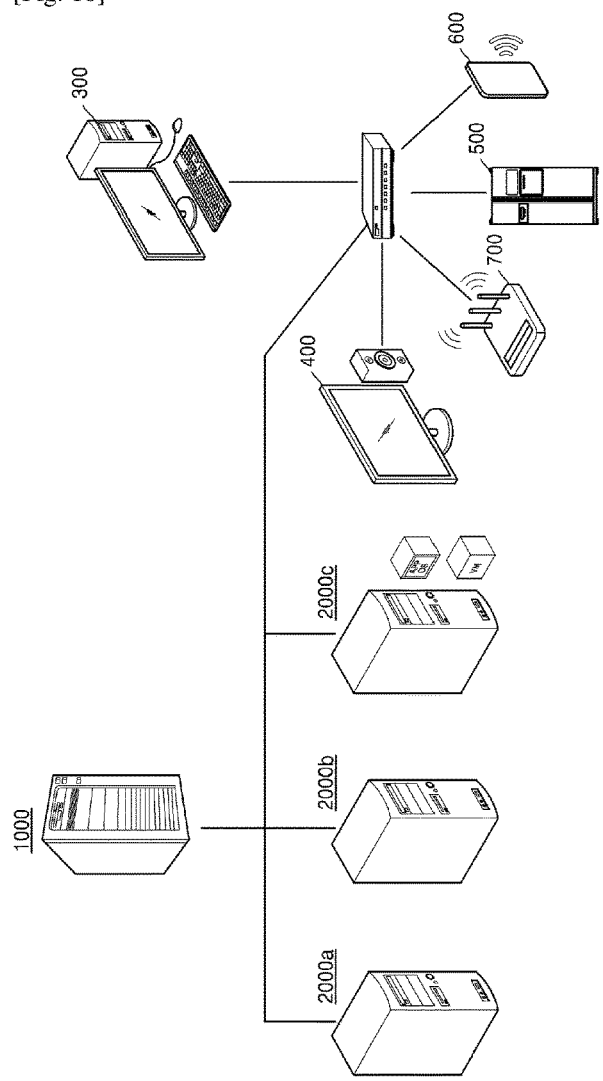
[Fig. 17]
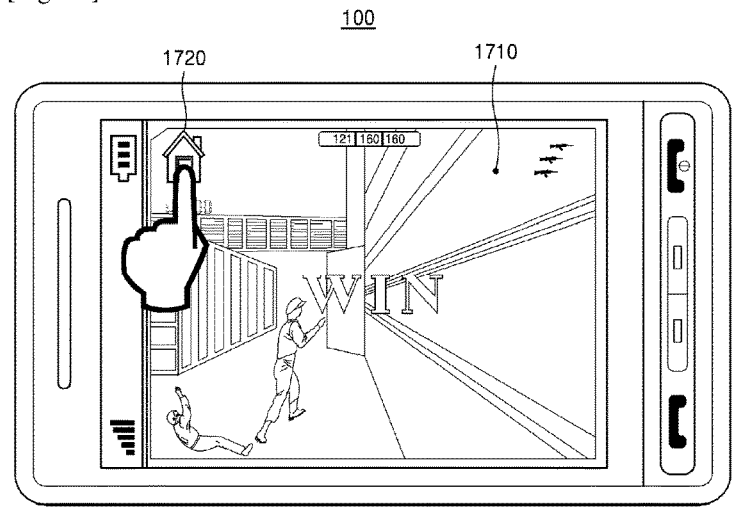

[Fig. 18a]
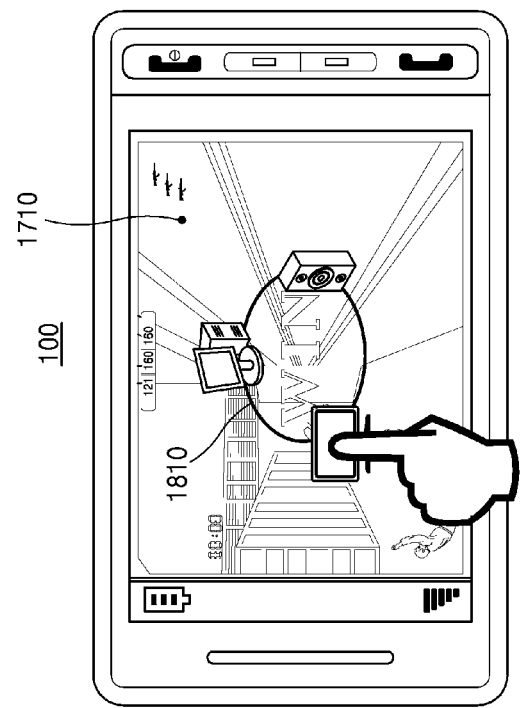
[Fig. 18b]
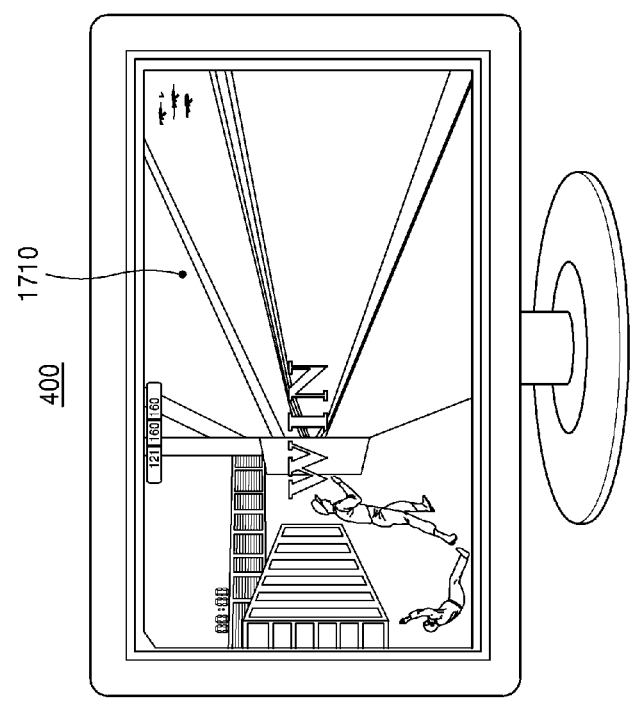

[Fig. 19]
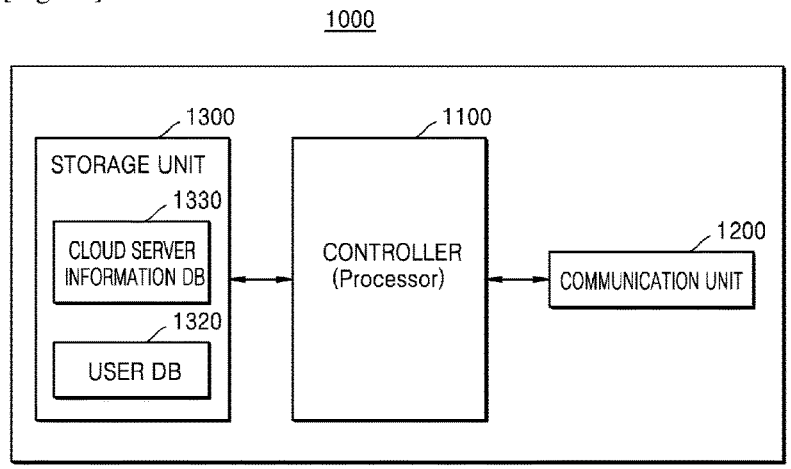
[Fig. 20]
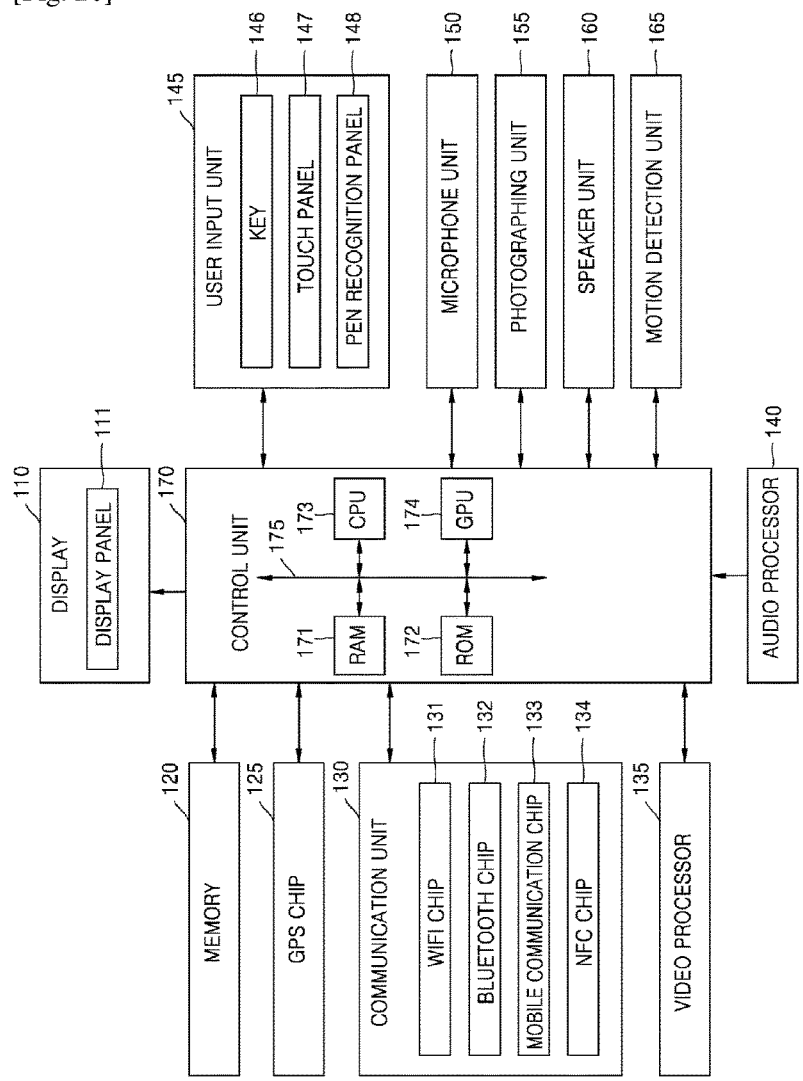

METHOD AND APPARATUS FOR MIGRATING VIRTUAL MACHINE FOR IMPROVING MOBILE USER EXPERIENCE

TECHNICAL FIELD

The present disclosure relates to methods and apparatuses for migrating a virtual machine by using a device.

BACKGROUND ART

Since applications executed in a mobile device require more computing resources than are available in the mobile device, a technique of offloading workloads of the applications to a server is being developed.

For example, an application may be executed by using a computing resource of the server, and the mobile device may receive a result of executing the application from the server and may output the execution result. Accordingly, a user may have an experience as if the application were executed in the mobile device.

However, when the user keeps moving, if a distance between the mobile device and the server is increased, data transmission between the mobile device and the server may become slow. Also, the mobile device may require a virtual machine having a higher calculation capacity according to a characteristic of a workload. Therefore, there is a demand for a method of migrating, by the mobile device, a virtual machine of the mobile device to a highly appropriate cloud server.

DISCLOSURE OF INVENTION

Solution to Problem

Provided are methods and apparatuses for migrating a virtual machine by using a mobile device.

BRIEF DESCRIPTION OF DRAWINGS

These and/or other aspects will become apparent and more readily appreciated from the following description of the exemplary embodiments, taken in conjunction with the accompanying drawings in which:

FIG. 1A is a drawing for describing a method of migrating a virtual machine of a mobile device, the method performed by a cloud control server, according to an exemplary embodiment;

FIG. 1B is a drawing for describing a method of determining, based on an estimated latency, a cloud server to which a virtual machine is to be migrated, the method performed by the cloud control server, according to an exemplary embodiment;

FIG. 1C is a drawing for describing a method of migrating a virtual machine, based on latencies, the method performed by the cloud control server, according to an exemplary embodiment;

FIG. 1D is a drawing for describing a method of determining, based on estimated charged costs, the cloud server to which a virtual machine is to be migrated, the method performed by the cloud control server, according to an exemplary embodiment;

FIG. 1E is a drawing for describing a method of determining, based on estimated battery consumption of the mobile device, the cloud server to which a virtual machine is to be migrated, the method performed by the cloud control server, according to an exemplary embodiment;

FIG. 1F is a drawing for describing a method of providing a menu for setting a reference with respect to determining a migration server, the method performed by the mobile device, according to an exemplary embodiment;

FIG. 2 is a flowchart of a method of migrating a virtual machine based on a user's selection, the method performed by the cloud control server, according to an exemplary embodiment;

FIG. 3 is a drawing for describing a method of migrating a virtual machine, according to an exemplary embodiment;

FIG. 4 is a flowchart of a method of migrating a virtual machine based on a user's selection, the method performed by the cloud control server, according to another exemplary embodiment;

FIG. 5 is a drawing for describing a method of providing a user interface for selecting the cloud server to which a virtual machine of the mobile device is to be migrated, the method performed by the mobile device, according to an exemplary embodiment;

FIG. 6A is a drawing for describing a method of providing a user interface for selecting the cloud server to which a virtual machine of the mobile device is to be migrated, the method performed by the mobile device, according to another exemplary embodiment;

FIG. 6B is a drawing for describing a method of providing a user interface for selecting the cloud server to which a virtual machine of the mobile device is to be migrated, the method performed by the mobile device, according to another exemplary embodiment;

FIG. 7 is a flowchart of a method of determining, based on movement route information of a user of the mobile device, the cloud server to which a virtual machine of the mobile device is to be migrated, the method performed by the cloud control server, according to an exemplary embodiment;

FIG. 8 is a flowchart of a method of determining, based on movement route information of a user of the mobile device, the cloud server to which a virtual machine of the mobile device is to be migrated, the method performed by the cloud control server, according to another exemplary embodiment;

FIG. 9 illustrates user's movement route information that is stored in the cloud control server, according to an exemplary embodiment;

FIG. 10 is a drawing for describing a method of determining, based on movement route information of a user, the cloud server to which a virtual machine of the mobile device is to be migrated, the method performed by the cloud control server, according to another exemplary embodiment;

FIG. 11 is a drawing for describing a method of determining, based on movement route information of a user and a latency, the cloud server to which a virtual machine of the mobile device is to be migrated, the method performed by the cloud control server, according to another exemplary embodiment;

FIG. 12 is a flowchart of a method of migrating a virtual machine of the mobile device, based on an estimated route along which the mobile device is to be moved and a virtual machine use pattern of a user, the method performed by the cloud control server, according to an exemplary embodiment;

FIG. 13A illustrates user's virtual machine use pattern information stored in the cloud control server, according to an exemplary embodiment;

FIG. 13B is a diagram for describing a method of migrating a virtual machine of the mobile device, based on an estimated route along which the mobile device is to be moved and a virtual machine use pattern of a user, the method performed by the cloud control server, according to another exemplary embodiment;

FIG. 14A illustrates information about movement routes and virtual machine use patterns of a user stored in the cloud control server, according to another exemplary embodiment;

FIG. 14B is a diagram for describing a method of migrating a virtual machine of the mobile device, based on an estimated route along which the mobile device is to be moved and a virtual machine use pattern of a user, the method performed by the cloud control server, according to another exemplary embodiment;

FIG. 15 is a diagram for describing a method of migrating a virtual machine between a home cloud server and one of public cloud servers, when the home cloud server is registered in the cloud control server, according to an exemplary embodiment;

FIG. 16 is a diagram for describing a method of executing a virtual machine by using a home cloud system, the method performed by the home cloud server, according to an exemplary embodiment;

FIG. 17 illustrates a user interface that is displayed on a screen of the mobile device when the mobile device enters a home zone, according to an exemplary embodiment;

FIG. 18 is a diagram for describing a method of displaying a user interface for receiving an input of selecting a device in a home cloud system, the method performed by the mobile device, according to an exemplary embodiment;

FIG. 19 is a block diagram of the cloud control server, according to an exemplary embodiment; and FIG. 20 is a block diagram illustrating a configuration of the mobile device, according to an exemplary embodiment.

BEST MODE FOR CARRYING OUT THE INVENTION

Additional aspects will be set forth in part in the description which follows and, in part, will be apparent from the description, or may be learned by practice of the presented exemplary embodiments.

According to an aspect of an exemplary embodiment, a cloud control server that controls a plurality of cloud servers includes a communication unit configured to transmit, to a mobile device, information about one or more cloud servers from among the plurality of cloud servers, and to receive, from the mobile device, identification information of a cloud server that is selected by a user of the mobile device and is from among the one or more cloud servers; and a controller configured to migrate a virtual machine of the mobile device to the selected cloud server from a cloud server in which the virtual machine of the mobile device is located and that is from among the plurality of cloud servers, wherein the virtual machine of the mobile device executes an application that is output from the mobile device.

The information about the one or more cloud servers may include at least one of identification information of each of the one or more cloud servers, name information of each of the one or more cloud servers, location information of each of the one or more cloud servers, information of a distance between the mobile device and each of the one or more cloud servers, configuration information of a virtual machine providable by each of the one or more cloud servers, and computation capability information of the virtual machine providable by each of the one or more cloud servers.

The communication unit may be further configured to receive, from the mobile device, a request for the information about the one or more cloud servers capable of providing the virtual machine, and to transmit the information about the one or more cloud servers to the mobile device when the request is received.

The communication unit may be further configured to obtain location information of the mobile device, to determine, based on the location information of the mobile device, the one or more cloud servers located within a preset distance from a location of the mobile device, and to transmit the information about the one or more cloud servers to the mobile device.

The communication unit may be further configured to determine, based on a computation capability for executing the application, the one or more cloud servers capable of providing the virtual machine having the computation capability, and to transmit the information about the one or more cloud servers to the mobile device.

According to an aspect of another exemplary embodiment, a cloud control server that controls a plurality of cloud servers includes a communication unit configured to obtain movement route information of a user of a mobile device and location information of the mobile device; and a controller configured to determine an estimated route along which the mobile device is to be moved, based on the location information and the movement route information of the user of the mobile device, to determine a cloud server to which a virtual machine of the mobile device is to be migrated, based on the estimated route along which the mobile device is to be moved, and to migrate the virtual machine of the mobile device to the determined cloud server from a cloud server in which the virtual machine of the mobile device was being executed and that is from among the plurality of cloud servers, wherein the virtual machine of the mobile device executes an application that is output from the mobile device.

The estimated route of the mobile device may include an estimated speed of the mobile device on the estimated route, and the controller may be further configured to determine one or more cloud servers located within a preset distance from the estimated route of the mobile device, and to determine, based on the estimated speed of the mobile device, the cloud server that is from among the one or more cloud servers and to which the virtual machine of the mobile device is to be migrated.

The controller may be further configured to determine one or more cloud servers located within a preset distance from the estimated route of the mobile device, and to determine a cloud server that provides a virtual machine having a highest computation capability from among the one or more cloud servers, as the cloud server to which the virtual machine of the mobile device is to be migrated.

The controller may be further configured to obtain use pattern information of the user with respect to the virtual machine of the mobile device, to determine, based on the use pattern information, a time to migrate the virtual machine of the mobile device, and to migrate the virtual machine of the mobile device at the determined time.

The controller may be further configured to determine, based on the use pattern information, a time period in which the user does not use the virtual machine of the mobile device during a preset time period, as the time to migrate the virtual machine of the mobile device, and to migrate the virtual machine of the mobile device at the determined time.

According to an aspect of another exemplary embodiment, a method of migrating a virtual machine, the method performed by a cloud control server that controls a plurality of cloud servers, includes transmitting, to a mobile device, information about one or more cloud servers from among the plurality of cloud servers; receiving, from the mobile device, identification information of a cloud server that is selected by a user of the mobile device and is from among the one or more cloud servers; and migrating a virtual machine of the mobile device to the selected cloud server from a cloud server in which the virtual machine of the mobile device is located and that is from among the plurality of cloud servers, wherein the virtual machine of the mobile device executes an application that is output from the mobile device.

The information about the one or more cloud servers may include at least one of identification information of each of the one or more cloud servers, name information of each of the one or more cloud servers, location information of each of the one or more cloud servers, information of a distance between the mobile device and each of the one or more cloud servers, configuration information of a virtual machine providable by each of the one or more cloud servers, and computation capability information of the virtual machine providable by each of the one or more cloud servers.

The transmitting of the information may include receiving, from the mobile device, a request for the information about the one or more cloud servers capable of providing the virtual machine; and when the request is received, transmitting the information about the one or more cloud servers to the mobile device.

The transmitting of the information may include obtaining location information of the mobile device; determining, based on the location information of the mobile device, the one or more cloud servers that are located within a preset distance from a location of the mobile device; and transmitting the information about the one or more cloud servers to the mobile device.

The transmitting of the information may include determining, based on a computation capability for executing the application, the one or more cloud servers capable of providing the virtual machine having the computation capability; and transmitting the information about the one or more cloud servers to the mobile device.

According to an aspect of another exemplary embodiment, a method of migrating a virtual machine, the method performed by a cloud control server that controls a plurality of cloud servers, includes obtaining movement route information of a user of a mobile device; obtaining location information of the mobile device; determining an estimated route along which the mobile device is to be moved, based on the location information and the movement route information of the user of the mobile device; determining a cloud server to which a virtual machine of the mobile device is to be migrated, based on the estimated route along which the mobile device is to be moved; and migrating the virtual machine of the mobile device to the determined cloud server from a cloud server in which the virtual machine of the mobile device was being executed and that is from among the plurality of cloud servers, wherein the virtual machine of the mobile device executes an application that is output from the mobile device.

The estimated route of the mobile device may include an estimated speed of the mobile device on the estimated route, and the determining of the cloud server based on the estimated route may include determining one or more cloud servers that are located within a preset distance from the estimated route of the mobile device; and determining, based on the estimated speed of the mobile device, the cloud server that is from among the one or more cloud servers and to which the virtual machine of the mobile device is to be migrated.

The determining of the cloud server based on the estimated route may include determining one or more cloud servers that are located within a preset distance from the estimated route of the mobile device; and determining a cloud server that provides a virtual machine having a highest computation capability from among the one or more cloud servers, as the cloud server to which the virtual machine of the mobile device is to be migrated.

The determining of the cloud server based on the estimated route may include obtaining use pattern information of the user with respect to the virtual machine of the mobile device; determining, based on the use pattern information, a time to migrate the virtual machine of the mobile device; and migrating the virtual machine of the mobile device at the determined time.

The determining of the time to migrate the virtual machine may include determining, based on the use pattern information, a time period in which the user does not use the virtual machine of the mobile device during a preset time period, as the time to migrate the virtual machine of the mobile device.

MODE FOR THE INVENTION

This application claims the benefit of Korean Patent Application No. 10-2014-0136963, filed on Oct. 10, 2014, in the Korean Intellectual Property Office, the disclosure of which is incorporated herein in its entirety by reference.

Hereinafter, terms that are used in the specification will be briefly described, and the inventive concept will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the inventive concept. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

Throughout the specification, the term "virtualization" may indicate a capability of executing a plurality of operating systems in one physical server. In this case, the operating systems may operate respectively in hardware environments that are independent and separate from each other, and an application may be executed based on one of each of the operating systems.

Throughout the specification, the term "virtual machine" may collectively indicate an operating system and an application that are performed in a virtualization environment. The virtual machine may have its own computing resource including a central processing unit (CPU), a memory, a hard disk, a network, etc. For example, a virtual machine having a 2 GHz CPU, a 2 GB Random Access Memory (RAM), a 10 GB hard disk, and a unique internet protocol (IP) address may be realized as software.

Throughout the specification, the term "configuration information of a virtual machine" may indicate information about a hardware resource that forms the virtual machine. For example, the configuration information of the virtual machine may include information about specifications of a CPU, a Graphics Processing Unit (GPU), a RAM, and a hard disk.

Throughout the specification, an actual physical device in which the virtual machine is being executed may be referred to as a host device. Also, an operating system of the actual physical device in which the virtual machine is being executed may be referred to as a host operating system. Also, an operating system executed in the virtual machine may be referred to as a guest operating system.

Throughout the specification, the term "virtual machine migration" may indicate that a virtual machine is migrated from one physical server or device to another physical server or device. For example, a source virtual machine in a first physical device being migrated to a second physical device may mean that a target virtual machine is generated in the second physical device, and data in the source virtual machine is transferred to the generated target virtual machine.

For example, data in one virtual machine may include data in a hard disk of the virtual machine, data in a memory of the virtual machine, CPU register data of the virtual machine, or the like.

Throughout the specification, the term "cloud server" may generally indicate an infrastructure in which a virtualized computing environment is configured in a plurality of physical machines. The cloud server may dynamically allocate or remove a hardware resource, and may provide a virtual machine service to a plurality of users. The cloud server may include a public cloud server and a home cloud server.

The public cloud server may indicate an open-type cloud service by which a general user may be allocated a virtual machine and may use the virtual machine. The public cloud server may be run by a service provider that provides a resource to execute the virtual machine. Each of users who joined a public cloud service may execute the virtual machine through the public cloud server by using an account registered in the public cloud server.

The home cloud server may indicate a cloud service for a particular person or group. In some embodiments, the home cloud server may be referred to as a private cloud server.

Throughout the specification, the term "workload" may indicate a job that a device is required to process. The workload may indicate an entire application or an entire operating system or may indicate some codes of a program. When the workload is increased, the number of codes to be processed by a CPU, memory usage, network usage, and storage usage may also be increased.

Throughout the specification, the term "offloading" may indicate that a workload of a mobile device is not processed by the mobile device but is processed by a server, and a result of executing the workload is transmitted from the server to the mobile device, in such a manner that the workload of the mobile device is executed.

Throughout the specification, the term "latency" may indicate a time period from when a mobile device transmits a user input to a cloud server to when a result of executing a workload processed according to the user input is returned from the cloud server to the mobile device. The latency may be calculated based on resource information required to execute the workload, resource information of a virtual machine to process the workload, and a communication speed between the virtual machine and the mobile device.

Throughout the specification, the term "movement route information of a user" may mean information indicating a location of the user according to time. For example, the movement route information of the user may be information indicating the location of the user that changes according to time throughout a day.

Throughout the specification, the term "a user's use pattern with respect to a virtual machine" may be information indicating a point of time when a user uses the virtual machine or a location where the user uses the virtual machine.

One or more embodiments will now be described more fully with reference to the accompanying drawings. However, the one or more embodiments may be embodied in many different forms, and should not be construed as being limited to the embodiments set forth herein; rather, these embodiments are provided so that this disclosure will be thorough and complete, and will fully convey the concept of the one or more embodiments to those of ordinary skill in the art. In the following description, well-known functions or constructions are not described in detail since they would obscure the one or more embodiments with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, first through third cloud servers 2000*a* through 2000*c* may also be referred to as the cloud servers 2000 or the public cloud servers 2000.

FIG. 1A is a drawing for describing a method of migrating a virtual machine of a mobile device 100, the method performed by a cloud control server 1000, according to an exemplary embodiment.

Referring to FIG. 1A, the virtual machine that executes a workload of the mobile device 100 may be migrated from the first cloud server 2000*a* to the second cloud server 2000*b*.

The workload of the mobile device 100 may be offloaded to one of first through third cloud servers 2000*a* through 2000*c* that are also referred to as cloud servers 2000.

For example, an application or an operating system required to be executed in the mobile device 100 may be offloaded to a cloud server 2000. The cloud server 2000 may execute the application or the operating system offloaded from the mobile device 100, and may transmit a result of executing the application or the operating system to the mobile device 100.

For example, when the mobile device 100 requests the cloud server 2000 to execute a game, the cloud server 2000 may generate a virtual machine to execute the requested game, and may control the virtual machine to execute a game application. When the game application is executed, the cloud server 2000 may transmit only an execution result (e.g., a game execution image, sound data, etc.) of the game to the mobile device 100. The mobile device 100 may receive the execution result of the game from the cloud server 2000, and may output the received execution result of the game. Also, the cloud server 2000 may receive a user input of the mobile device 100 from the mobile device 100. The cloud server 2000 may execute the received user input as if the user input were input directly to the virtual machine in the cloud server 2000. The virtual machine in the cloud server 2000 may execute the game application, according to the received user input.

Also, some codes of a program of an application or operating system to be executed in the mobile device 100 may be offloaded to the cloud server 2000. For example, while the mobile device 100 executes a motion recognition application, the mobile device 100 may offload, to the cloud server 2000, a module consisting of codes that require a large amount of computation. In this case, a call for the offloaded module may be implemented via a remote procedure call (RPC) process. The cloud server 2000 may execute the offloaded module due to the call by the mobile device 100, and an execution result may be automatically returned to the mobile device 100.

The mobile device 100 may offload a workload to the cloud server 2000, according to a user's selection. Also, according to a standard set in the mobile device 100, the mobile device 100 may automatically offload a workload to the cloud server 2000. For example, in a case where the mobile device 100 has to execute a workload requiring a large amount of computation or to execute a workload requiring heavy traffic with respect to an external database, the mobile device 100 may automatically offload the workload to the cloud server 2000.

The workload requiring the large amount of computation or the workload requiring heavy traffic with respect to the external database may include an optical character reader application, an intelligent character recognition application, a motion recognition application, a face recognition application, a facial expression recognition application, an object recognition application, a voice recognition application, an augmented reality application, an intelligence database, an image search application, a virus scanning application, a behavior profiling application, or the like.

Offloading of a workload of the mobile device 100 may be applied to a web application. For example, in a case where a webpage transmitted to the mobile device 100 includes a rendered object requiring a large amount of computation, the cloud server 2000 that operates as a proxy server between a web server and the mobile device 100 may render the object, which requires the large amount of computation, of the webpage transmitted to the mobile device 100, and thus may execute a workload of the mobile device 100.

The mobile device 100 may offload a workload to be executed in the mobile device 100 to the cloud server 2000. For example, the mobile device 100 may allow the workload of the mobile device 100 to be processed by the cloud server 2000, may receive a result of executing the workload from the cloud server 2000, and thus may provide the execution result of the workload to a user. The mobile device 100 may receive a user input from the user, and may transmit the user input to the cloud server 2000. Accordingly, the user may have an experience as if an application were executed in the mobile device 100.

The cloud control server 1000 may be a server that manages the cloud servers 2000. The cloud control server 1000 may a separate server that does not have capability to execute a virtual machine or may be one of the cloud servers 2000 enabled to execute or to migrate a virtual machine.

The cloud control server 1000 may monitor the cloud servers 2000. For example, the cloud control server 1000 may receive virtual machine information about virtual machines to be provided by the cloud servers 2000 from the cloud servers 2000. The virtual machine information may include the number of virtual machines that the cloud servers 2000 may generate. Also, the virtual machine information may include resource specification information of a virtual machine, estimated latency information of the virtual machine, estimated charged costs information, and estimated battery use information.

The cloud control server 1000 may monitor the mobile device 100 and a virtual machine of the mobile device 100. For example, the cloud control server 1000 may periodically receive location information of the mobile device 100 from the mobile device 100. Also, the cloud control server 1000 may monitor whether the virtual machine of the mobile device 100 is being used.

The cloud control server 1000 may interoperate with the mobile device 100 and thus may determine a cloud server 2000 to which the virtual machine of the mobile device 100 is migrated from among the cloud servers 2000.

For example, the cloud control server 1000 may calculate a latency, based on resource information required to execute a migration target workload, resource information of each of virtual machines that are providable by the cloud servers 2000, and an estimated communication speed between the mobile device 100 and each of the virtual machines, and may determine a cloud server 2000 having a minimum latency in executing a virtual machine, as the target cloud server 2000 to which the virtual machine is to be migrated.

The latency may indicate a time period from when the mobile device 100 transmits a user input to the cloud server 2000 to when an execution result of a workload processed according to the user input is returned from the cloud server 2000 to the mobile device 1000. Therefore, when a specification of a resource required to execute the workload is further increased, and performance of a virtual machine providable by the cloud server 2000 is further decreased or a distance between the mobile device 100 and the cloud server 2000 is further increased, the latency may increase.

Also, for example, the cloud control server 1000 may determine a cloud server 2000 with least costs, as the target cloud server 2000 to which the virtual machine is to be migrated, based on the resource information required to execute the migration target workload, information about virtual machines providable by the cloud servers 2000, a distance between the mobile device 100 and each of the cloud servers 2000, and estimated charged costs due to use of a resource.

Also, for example, the cloud control server 1000 may calculate a use amount of a battery of each of the cloud servers 2000, based on the resource information required to execute the migration target workload, the information about virtual machines providable by the cloud servers 2000, and the distance between the mobile device 100 and each of the cloud servers 2000. Then, based on the calculated use amount of the battery, the cloud control server 1000 may determine the cloud server 2000 corresponding to the least battery consumption, as the target cloud server 2000 to which the virtual machine is to be migrated.

Also, for example, the cloud control server 1000 may receive identification information of the cloud server 2000 selected by the user of the mobile device 100 from the mobile device 100, and may determine the selected cloud server 2000 as the target cloud server 2000 to which the virtual machine is to be migrated.

Also, for example, the cloud control server 1000 may determine an estimated movement route of the mobile device 100, based on a current location of the mobile device 100 and movement route information of the user of the mobile device 100, and based on the estimated movement route of the mobile device 100, the cloud control server 1000 may determine the cloud server 2000 that is the most adjacent to an estimated route, as the target cloud server 2000 to which the virtual machine of the mobile device 100 is to be migrated.

Also, for example, the cloud control server 1000 may consider an estimated route and an estimated speed of the mobile device 100, and thus may determine the cloud server 2000 that least causes migration on the estimated route, as the target cloud server 2000 to which the virtual machine of the mobile device 100 is to be migrated.

Also, for example, the cloud control server 1000 may determine when to migrate the virtual machine of the mobile device 100, based on virtual machine use pattern information of the user of the mobile device 100. For example, based on the virtual machine use pattern information of the user, the cloud control server 1000 may determine a time period during which the user does not use the virtual machine for a predefined length of time, and may migrate the virtual machine of the user in the determined time period.

When the target cloud server 2000 to which the virtual machine is to be migrated is determined, the cloud control server 1000 may control the cloud servers 2000 so as to allow the virtual machine to be migrated to the determined target cloud server 2000.

FIG. 1B is a drawing for describing a method of determining, based on an estimated latency, the cloud server 2000 to which a virtual machine is to be migrated, the method performed by the cloud control server 1000, according to an exemplary embodiment.

Referring to FIG. 1B, the cloud control server 1000 may calculate estimated latencies of the first, second, and third cloud servers 2000*a*, 2000*b*, and 2000*c*, respectively, and may migrate a virtual machine in the second cloud server 2000*b* to the third cloud server 2000*c* having the smallest latency.

A latency may indicate a time period from when a mobile device transmits a user input to a cloud server to when an execution result of a workload processed according to the user input is returned from the cloud server to the mobile device.

The cloud control server 1000 may determine a computation processing capability, memory specification, and a network speed that are required in executing the workload. For example, the cloud control server 1000 may receive resource information for executing the workload from the mobile device 100. Also, for example, the cloud control server 1000 may receive resource information that is for executing a workload and is calculated by the cloud server 2000, from the cloud server 2000 in which a virtual machine that executes the workload of the mobile device 100 is positioned.

The cloud control server 1000 may calculate estimated latencies corresponding to the cloud servers 2000, respectively, based on resource information for executing a workload, information about virtual machines providable by the cloud servers 2000, and a distance between the mobile device 100 and each of the cloud servers 2000.

For example, when a computation processing speed of a virtual machine is lower than a computation processing speed requested by a workload, the cloud control server 1000 may determine an estimated latency to be high. Also, when a memory of the virtual machine is smaller than a memory requested by the workload, the cloud control server 1000 may determine the estimated latency to be high.

Also, for example, when a distance between the mobile device 100 and the cloud server 2000 is increased, the cloud control server 1000 may determine an estimated latency to be high.

Also, the cloud control server 1000 may transmit network addresses of the cloud servers 2000 to the mobile device 100, and may request the mobile device 100 to test (e.g., a ping test) network states with the cloud servers 2000. When the network states with the cloud servers 2000 are received from the mobile device 100, the cloud control server 1000 may determine an estimated latency of the cloud server 2000 to be high since a packet exchange time and a packet loss rate of the cloud server 2000 are great.

Referring to FIG. 1B, a distance between the mobile device 100 and the first cloud server 2000*a* is shortest, but a computation processing speed and a memory capacity of the first cloud server 2000*a* are less than a minimum specification requested by the workload of the mobile device 100, and thus, the cloud control server 1000 may determine that an estimated latency of the first cloud server 2000*a* is higher than an estimated latency of the third cloud server 2000*c*. Accordingly, the cloud control server 1000 may migrate the virtual machine in the second cloud server 2000*b* to the third cloud server 2000*c*.

FIG. 1C is a drawing for describing a method of migrating a virtual machine, based on latencies, the method performed by the cloud control server 1000, according to an exemplary embodiment.

Referring to FIG. 1C, since the mobile device 100 is moved, the cloud control server 1000 may calculate a latency, and may migrate a virtual machine, based on the calculated latency.

Referring to FIG. 1C, a user of the mobile device 100 starts from Busan city and goes to Seoul city by train. The user recognizes characters of newspapers and thus retrieves information by using an optical character reader application in the mobile device 100. Also, the cloud control server 1000 is set to migrate a virtual machine of the user, based on a latency. The user offloaded the optical character reader application to a server 1 2000*a* (e.g., a smart TV) that is a cloud server in the user's home, and got on the train. A virtual machine in the server 1 2000*a* executes the optical character reader application by interoperating with the mobile device 100.

The cloud control server 1000 may monitor the virtual machine of the mobile device 100. When the train starts and thus the mobile device 100 becomes distant from the server 1 2000*a*, a latency between the mobile device 100 and the server 1 2000*a* may increase.

Since the mobile device 100 is moving toward Dongdaegu city, the cloud control server 1000 may calculate latencies of the server 1 2000*a* and a server 2 2000*b*. For example, the cloud control server 1000 may calculate the latencies of the server 1 2000*a* and the server 2 2000*b*, based on distances between the mobile device 100 and the servers 1 2000*a* and 2 2000*b*, and computation processing speeds of the servers 1 2000*a* and 2 2000*b*. Referring to FIG. 1C, as the mobile device 100 gets closer to the server 2 2000*b*, and the computation processing speed of the server 2 2000*b* is higher than that of the server 1 2000*a*, the cloud control server 1000 may migrate the virtual machine in the server 1 2000*a* to the server 2 2000*b*.

Since the mobile device 100 is moving toward Gwangmyung city from Dongdaegu city, the cloud control server 1000 may calculate latencies of the server 2 2000*b* and a server 3 2000*c*. As the mobile device 100 gets closer to the server 3 2000*c*, and a computation processing speed of the server 3 2000*c* is higher than that of the server 2 2000*b*, the cloud control server 1000 may migrate a virtual machine in the server 2 2000*b* to the server 3 2000*c*.

Since the mobile device 100 is moving toward Seoul city from Gwangmyung city, the cloud control server 1000 may calculate latencies of the server 3 2000*c* and a server 4 2000*d*. Referring to FIG. 1C, although the mobile device 100 gets closer to the server 4 2000*d*, a difference between a distance between the mobile device 100 and the server 4 2000*d* and a distance between the mobile device 100 and the server 3 2000*c* is not large, a computation processing speed of the server 4 2000*d* does not satisfy a computation processing speed required by a workload, and the computation processing speed of the server 4 2000*d* is significantly less than the computation processing speed of the server 3 2000*c*, and thus, the cloud control server 1000 does not migrate a virtual machine in the server 3 2000*c* to the server 4 2000*d* and may keep executing the virtual machine in the server 3 2000*c*.

FIG. 1D is a drawing for describing a method of determining, based on estimated charged costs, the cloud server 2000 to which a virtual machine is to be migrated, the method performed by the cloud control server 1000, according to an exemplary embodiment.

Referring to FIG. 1D, the cloud control server 1000 may calculate estimated charged costs corresponding to the cloud servers 2000, respectively, and may migrate a virtual machine in the second cloud server 2000*b* to the third cloud server 2000*c* whose calculated estimated charged cost is minimal.

The cloud control server 1000 may store charging policies corresponding to the cloud servers 2000, respectively. For example, a cost to be charged may have been determined in correspondence with each of the cloud servers 2000, according to performance of CPUs configuring a virtual machine, the number of the CPUs, a memory capacity, a hardware capacity, a type of an operating system, and whether a GPU and a video graphics card are arranged. Also, for example, a cost to be charged may be determined, in consideration of a network usage fee with respect to connecting with each of the cloud servers 2000.

The cloud control server 1000 may calculate the estimated charged costs, based on resource information for executing a workload to be migrated, and the charging policies corresponding to the cloud servers 2000, respectively. For example, in correspondence with each of the cloud servers 2000, the cloud control server 1000 may obtain a price of a virtual machine that satisfies a lowest specification requested by the workload and that is from among virtual machines providable by the cloud servers 2000. For example, in a case where the lowest specification requested by a workload of the mobile device 100 is a CPU with 1 GHz and a memory with 2 GB, the cloud control server 1000 may determine a price of a virtual machine consisting of a CPU with 2 GHz, a memory with 2 GB, and a hard disk with 20 GB, as a price corresponding to the third cloud server 2000*c*, wherein the virtual machine is from among virtual machines having different resources provided by the third cloud server 2000*c*.

Referring to FIG. 1D, the cloud control server 1000 may migrate the virtual machine in the second cloud server 2000*b* to the first cloud server 2000*a* whose estimated charged cost is free.

FIG. 1E is a drawing for describing a method of determining, based on estimated battery consumption of the mobile device 100, the cloud server 2000 to which a virtual machine is to be migrated, the method performed by the cloud control server 1000, according to an exemplary embodiment.

Referring to FIG. 1E, the cloud control server 1000 may calculate estimated battery consumptions of the mobile device 100 with respect to the cloud servers 2000, respectively, and may migrate a virtual machine in the second cloud server 2000*b* to the cloud server 2000 corresponding to the least calculated battery consumption.

The battery consumption of the mobile device 100 may vary in each of the cloud servers 2000, according to a type or a state of a network connected with the cloud servers 2000. For example, if the mobile device 100 may be directly connected to the cloud server 2000 via a short-distance wireless network (e.g., Wi-Fi), the battery consumption of the mobile device 100 may be decreased.

If a communication speed with the cloud server 2000 is slow or a packet loss rate of the cloud server 2000 is high, a packet retransmission time or a packet wait time is increased, such that the battery consumption of the mobile device 100 may be increased.

The battery consumption of the mobile device 100 may be determined, in consideration of resource information for executing a workload and information about virtual machines providable by the cloud servers 2000. For example, if the cloud server 2000 cannot provide a virtual machine that satisfies a lowest specification required by a workload to be migrated, a latency may increase. When the latency is increased, a time period in which the mobile device 100 outputs an execution result is increased, and when the time period for outputting the execution result is increased, the battery consumption of the mobile device 100 may be increased.

Referring to FIG. 1E, a distance between the mobile device 100 and the first cloud server 2000*a* is shortest, and the mobile device 100 is enabled for short-distance wireless communication with the first cloud server 2000*a*. However, a computation processing speed and a memory capacity of the first cloud server 2000*a* are less than a lowest specification requested by the workload of the mobile device 100. Also, a distance between the mobile device 100 and the third cloud server 2000*c* is less than a distance between the mobile device 100 and the second cloud server 2000*b*. Therefore, the cloud control server 1000 may determine that the estimated battery consumptions are greatest in an order of the third cloud server 2000*c*, the first cloud server 2000*a*, and the second cloud server 2000*b*.

Accordingly, the cloud control server 1000 may migrate the virtual machine in the second cloud server 2000*b* to the third cloud server 2000*c*.

FIG. 1F is a drawing for describing a method of providing a menu for setting a reference with respect to determining a migration server, the method performed by the mobile device 100, according to an exemplary embodiment.

Referring to FIG. 1F, the mobile device 100 may provide the menu for setting a reference with respect to determining the migration server.

The reference with respect to determining the migration server may include a minimum latency, a minimum charged cost, and minimum battery consumption.

When a user input of selecting one of references with respect to determining a plurality of migration servers displayed on a screen of the mobile device 100 is received, the mobile device 100 may transmit the selected reference to the cloud control server 1000. In this case, the mobile device 100 may also transmit, to the cloud control server 1000, user identification information and identification information of the mobile device 100 that are registered in the cloud control server 1000.

When information about the reference with respect to determining the migration server is received from the mobile device 100, the cloud control server 1000 may store the received information about the reference with respect to determining the migration server, in correspondence with the user identification information or the identification information of the mobile device 100.

Also, the cloud control server 1000 may migrate the workload of the mobile device 100, based on the reference with respect to determining the migration server selected by a user.

While FIG. 1 illustrates the method of providing the menu for selecting one reference from among the plurality of migration servers, the mobile device 100 may provide a menu for selecting a plurality of references.

FIG. 2 is a flowchart of a method of migrating a virtual machine based on a user's selection, the method performed by the cloud control server 1000, according to an exemplary embodiment.

In operation S210, the cloud control server 1000 that controls the cloud servers 2000 may transmit, to the mobile device 100, information about one or more cloud servers 2000 from among the cloud servers 2000.

The information about the one or more cloud servers 2000 may include at least one of identification information, name information, and location information of each cloud server 2000, information about a distance between the mobile device 100 and each cloud server 2000, configuration information of a virtual machine providable by each cloud server 2000, and computation capability information of the virtual machine providable by each cloud server 2000.

The cloud control server 1000 may periodically transmit the information about the one or more cloud servers 2000 to the mobile device 100. Also, when the cloud control server 1000 receives, from the mobile device 100, a request for information about at least one cloud server 2000 capable of providing a virtual machine, the cloud control server 1000 may transmit the information about the one or more cloud servers 2000 to the mobile device 100.

The cloud control server 1000 may determine the one or more cloud servers 2000 that are from among the cloud servers 2000 and are capable of executing a virtual machine of the mobile device 100, and may transmit information about the one or more cloud servers 2000 to the mobile device 100.

For example, the cloud control server 1000 may obtain location information of the mobile device 100, and may determine, based on the location information of the mobile device 100, the one or more cloud servers 2000 that are located within a preset distance from a location of the mobile device 100.

Also, for example, the cloud control server 1000 may determine, based on a computation capability for executing an application, one or more cloud servers 2000 capable of providing virtual machines having the computation capability for executing the application.

When the one or more cloud servers 2000 are determined, the cloud control server 1000 may transmit the information about the one or more cloud servers 2000 to the mobile device 100.

In operation S220, the cloud control server 1000 may receive, from the mobile device 100, identification information of the cloud server 2000 that is from among the one or more cloud servers 2000 and is selected by the user.

In operation S230, the cloud control server 1000 may migrate a virtual machine of the mobile device 100 from the cloud server 2000 in which the virtual machine is positioned to the selected cloud server 2000 from among the one or more cloud servers 2000.

The virtual machine of the mobile device 100 may execute an application that is output from the mobile device 100. The cloud control server 1000 may request the cloud server 2000, in which the virtual machine of the mobile device 100 is being executed, to migrate the virtual machine of the mobile device 100 to the cloud server 2000 selected by the user. A method of migrating the virtual machine of the mobile device 100 to the selected cloud server 2000 from the cloud server 2000 in which the virtual machine of the mobile device 100 was being executed will be described in detail with reference to FIG. 3.

FIG. 3 is a drawing for describing a method of migrating a virtual machine, according to an exemplary embodiment.

Referring to FIG. 3, the first cloud server 2000*a* and the second cloud server 2000*b* may migrate a virtual machine executed in the first cloud server 2000*a* to the second cloud server 2000*b*.

The first cloud server 2000*a* or the second cloud server 2000*b* may be a host device. Alternatively, the first cloud server 2000*a* or the second cloud server 2000*b* may be a home cloud server or a public cloud server.

The first cloud server 2000*a* may include host hardware 2000*a*_30, a host operating system 2000*a*_20, and a virtual machine manager 2000*a*_10.

The host hardware 2000*a*_30 may include a physical computing resource in the first cloud server 2000*a*. For example, the host hardware 2000*a*_30 may include a CPU, a hard disk, a RAM, a network resource, or the like.

The host operating system 2000*a*_20 may indicate an operating system installed in the first cloud server 2000*a*. That is, the host operating system 2000*a*_20 may indicate a program capable of controlling the host hardware 2000*a*_30. Also, various applications may be executed in host operating system 2000*a*_20. The virtual machine manager 2000*a*_10 may also be executed as an application in the host operating system 2000*a*_20.

The virtual machine manager 2000*a*_10 may generate a virtual machine. For example, the virtual machine manager 2000*a*_10 may receive a virtual machine generation request from an external device. The virtual machine generation request may include virtual machine configuration information.

The virtual machine manager 2000*a*_10 may manage a virtual machine. For example, the virtual machine manager 2000*a*_10 may delete or migrate the virtual machine.

The virtual machine manager 2000*a*_10 may monitor the virtual machine. For example, the virtual machine manager 2000*a*_10 may monitor a remaining capacity of a resource of the first cloud server 2000*a* for generating the virtual machine. Also, the virtual machine manager 2000*a*_10 may monitor a latency between the virtual machine and the mobile device 100.

When the virtual machine generation request is received from the external device, the virtual machine manager 2000*a*_10 may generate the virtual machine, based on the virtual machine generation request. For example, the virtual machine manager 2000*a*_10 may virtualize a resource requested in executing the virtual machine, based on the virtual machine configuration information.

For example, if the virtual machine configuration information indicates two CPUs with 2 GHz, a RAM with 2 GB, and a hard disk with 10 GB, the virtual machine manager 2000*a*_10 may generate a virtual machine having two CPUs with 2 GHz, a RAM with 2 GB, and a hard disk with 10 GB.

For example, the virtual machine manager 2000*a*_10 may allocate a physical memory in the first cloud server 2000*a* to the virtual machine so as to generate a memory or a hard disk of the virtual machine. Then, the virtual machine manager 2000a_10 may implement the hard disk by loading a file (e.g., a virtual hard disk file) capable of implementing the hard disk with 10 GB to the allocated memory. Also, the virtual machine manager 2000a_10 may decide 2 GB of the allocated memory as a memory of the virtual machine.

The virtual machine manager 2000a_10 may generate the two CPUs with 2 GHz by multiplexing the CPU of the first cloud server 2000a and thus may implement a CPU of the virtual machine.

Also, the virtual machine manager 2000a_10 may execute, in the virtual machine, an operating system for executing an application. Also, the virtual machine manager 2000a_10 may execute the application in the operating system that is executed in the virtual machine. The operating system and the application of the virtual machine may be stored in the hard disk of the virtual machine, and when execution codes of the operating system and the application stored in the hard disk are loaded to a RAM of the virtual machine, the operating system and the application may be executed in the virtual machine.

In some embodiments, virtualization of the hardware resource, the operating system, or the application may be referred to as instantiation of the hardware resource, the operating system, or the application.

The second cloud server 2000b may also include host hardware 2000b_30, a host operating system 2000b_20, and a virtual machine manager 2000b_10, and functions of the host hardware 2000b_30, the host operating system 2000b_20, and the virtual machine manager 2000b_10 may correspond to those of the first cloud server 2000a, respectively.

The first cloud server 2000a may migrate a second virtual machine executed in the first cloud server 2000a to the second cloud server 2000b.

For example, the virtual machine manager 2000a_10 of the first cloud server 2000a may request the virtual machine manager 2000b_10 of the second cloud server 2000b to migrate the second virtual machine in the first cloud server 2000a to the second cloud server 2000b. In this case, the migration request may include virtual machine configuration information. The second virtual machine in the first cloud server 2000a may be referred to as a source virtual machine.

When the migration request is received, the virtual machine manager 2000b_10 of the second cloud server 2000b may generate a virtual machine. For example, the virtual machine manager 2000b_10 may allocate a portion of a memory capacity of the second cloud server 2000b to a region for storing data in the source virtual machine to be received from the first cloud server 2000a. Also, the virtual machine manager 2000b_10 of the second cloud server 2000b may generate a computing resource of the virtual machine, based on the virtual machine configuration information. In this case, the virtual machine generated in the second cloud server 2000b may be referred to as a target virtual machine.

The virtual machine manager 2000a_10 of the first cloud server 2000a may transmit the data in the source virtual machine to the second cloud server 2000b.

For example, the virtual machine manager 2000a_10 of the first cloud server 2000a may transmit all data in the source virtual machine to the second cloud server 2000b. In this case, the virtual machine manager 2000a_10 of the first cloud server 2000a may migrate the virtual machine by transmitting entire data written to a memory portion that is allocated to the source virtual machine and is from among the memory of the first cloud server 2000a. Accordingly, CPU register data, and all data stored in a RAM and a hard disk in the source virtual machine may be transmitted to the second cloud server 2000b. By doing so, not only an application in the source virtual machine but also an operating system in the source virtual machine may be transmitted to the second cloud server 2000b.

Although not illustrated in FIG. 3, the virtual machine manager 2000a_10 of the first cloud server 2000a may transmit only the application in the source virtual machine to the second cloud server 2000b.

Also, the virtual machine manager 2000a_10 of the first cloud server 2000a may transmit state data (e.g., TCP control block) of a network protocol with the mobile device 100 to the second cloud server 2000b.

When the virtual machine manager 2000b_10 of the second cloud server 2000b receives the data in the source virtual machine from the virtual machine manager 2000a_10 of the first cloud server 2000a, the virtual machine manager 2000b_10 of the second cloud server 2000b may store RAM data of the source virtual machine, which is received from the first cloud server 2000a, in a RAM of the target virtual machine in the second cloud server 2000b. Also, the virtual machine manager 2000b_10 of the second cloud server 2000b may store hard disk data of the source virtual machine, which is received from the first cloud server 2000a, in a hard disk of the target virtual machine. Also, the virtual machine manager 2000b_10 of the second cloud server 2000b may write a CPU register value of the source virtual machine, which is received from the first cloud server 2000a, in a CPU register of the target virtual machine.

When the source virtual machine accesses a storage device inside or outside the first cloud server 2000a, the virtual machine manager 2000a_10 of the first cloud server 2000a may transmit information about access authority to the storage device to the second cloud server 2000b.

The virtual machine manager 2000b_10 of the second cloud server 2000b may execute the target virtual machine. When the target virtual machine is executed in the second cloud server 2000b, the target virtual machine may be connected with the mobile device 100 via a network. When the target virtual machine is connected with the mobile device 100, the second cloud server 2000b may transmit an execution result of the target virtual machine to the mobile device 100.

In some embodiments, the first cloud server 2000a may stop executing the source virtual machine, and may migrate the source virtual machine to the second cloud server 2000b.

In some embodiments, the first cloud server 2000a and the second cloud server 2000b may not stop executing the source virtual machine, and may migrate the source virtual machine to the second cloud server 2000b. Here, in a case where an application in the source virtual machine is executed and thus data in the source virtual machine is changed, only changed portion may be transmitted to the second cloud server 2000b. Also, the mobile device 100 may receive an execution result of the source virtual machine from the first cloud server 2000a until the mobile device 1000 is connected with the second cloud server 2000b.

FIG. 4 is a flowchart of a method of migrating a virtual machine based on user's selection, the method performed by the cloud control server 1000, according to another exemplary embodiment.

In operation S410, the mobile device 100 may execute an application by using a virtual machine in the first cloud server 2000a.

For example, an actual application and an actual operating system may be executed in the virtual machine in the first cloud server 2000*a*, and the mobile device 100 may receive an execution result of the virtual machine from the first cloud server 2000*a* and may output the execution result.

The mobile device 100 may transmit a user input to the first cloud server 2000*a*. When the user input is received from the mobile device 100, the first cloud server 2000*a* may execute the application based on the user input, and may transmit the execution result to the mobile device 100.

Accordingly, a user may use the mobile device 100 as if the actual application were being executed in the mobile device 100.

In operation S415, the mobile device 100 may receive a user input of selecting a menu for migrating a virtual machine of the mobile device 100.

For example, when the user input is received while the application is executed, the mobile device 100 may display the menu for migrating the virtual machine on an execution image of the application.

Since the user selects the menu for migrating the virtual machine that is being executed, the mobile device 100 may receive the user input of selecting the menu for migrating the virtual machine of the mobile device 100.

Also, for example, the mobile device 100 may provide a separate application for migrating a virtual machine. In this case, the mobile device 100 may provide an interface for migrating not only the executed virtual machine but also virtual machines stored in the cloud servers 2000.

In operation S420, the mobile device 100 may request the cloud control server 1000 for information about one or more cloud servers 2000 capable of executing the virtual machine of the mobile device 100.

The request for information about one or more cloud servers 2000 capable of executing the virtual machine of the mobile device 100 may include identification information of the virtual machine of the mobile device 100. Also, the request for information about one or more cloud servers 2000 capable of executing the virtual machine of the mobile device 100 may further include location information of the mobile device 100. Also, the request for information about one or more cloud servers 2000 capable of executing the virtual machine of the mobile device 100 may include user identification information and identification information of the mobile device 100 that are registered in the cloud control server 1000.

In operation S425, the cloud control server 1000 may determine one or more cloud servers 2000 capable of executing the virtual machine of the mobile device 100.

For example, the cloud control server 1000 may determine, based on the location information of the mobile device 100, the one or more cloud servers 2000 that are located within a preset distance from a location of the mobile device 100.

Also, for example, the cloud control server 1000 may determine the one or more cloud servers 2000, based on configuration information of the virtual machine of the mobile device 100. For example, the cloud control server 1000 may obtain the configuration information of the virtual machine of the mobile device 100, based on the identification information of the mobile device 100 received from the mobile device 100. The cloud control server 1000 may determine the one or more cloud servers 2000 capable of providing virtual machines including a configuration equal to a configuration of the virtual machine of the mobile device 100.

Also, the cloud control server 1000 may calculate latencies by considering all of a virtual machine computation capability required to execute a workload in the virtual machine of the mobile device 100, a computation capability of each of virtual machines providable by the cloud servers 2000, and a distance between the mobile device 100 and each of the cloud servers 2000, and may determine the one or more cloud servers 2000 whose latencies are equal to or less than a preset threshold value.

According to a characteristic of the workload in the virtual machine of the mobile device 100, the cloud control server 1000 may select the distance between the mobile device 100 and each of the cloud servers 2000 or the computation capability of each of the virtual machines, as a reference for determining the one or more cloud servers 2000.

For example, in a case where the workload in the virtual machine of the mobile device 100 causes lots of data exchanges between the mobile device 100 and the cloud server 2000, the cloud control server 1000 may determine the one or more cloud servers 2000, based on the distance between the mobile device 100 and each of the cloud servers 2000. Also, in a case where the workload (e.g., a computing-sensitive work or a big data analysis) in the virtual machine of the mobile device 100 a large amount of computation, the cloud control server 1000 may determine the one or more cloud servers 2000, based on the computation capability of each of the virtual machines.

In operation S430, the cloud control server 1000 may transmit information about the one or more cloud servers 2000 determined in the operation S425 to the mobile device 100.

The information about the one or more cloud servers 2000 may include identification information about each cloud server 2000, name information about each cloud server 2000, information about a distance between the mobile device 100 and each cloud server 2000, configuration information of a virtual machine providable by each cloud server 2000, computation capability information of the virtual machine providable by each cloud server 2000, and a latency of each cloud server 2000.

In operation S435, the mobile device 100 may display the information about the one or more cloud servers 2000 received from the cloud control server 1000.

For example, based on location information of each of the one or more cloud servers 2000 received from the cloud control server 1000, the mobile device 100 may display a map image, and may mark locations of the one or more cloud servers 2000 on the displayed map image.

Also, for example, the mobile device 100 may display, on locations of the one or more cloud servers 2000 on the map image, names of the one or more cloud servers 2000, a plurality of piece of information about distances between the mobile device 100 and the one or more cloud servers 2000, a plurality of piece of configuration information of virtual machines providable by the one or more cloud servers 2000, a plurality of piece of computation capability information of the virtual machines providable by the one or more cloud servers 2000, latencies, or the like.

In operation S440, the mobile device 100 may receive a user input of selecting the second cloud server 2000*b* from among the displayed one or more cloud servers 2000.

The mobile device 100 may provide the information about the one or more cloud servers 2000 to a user, and may receive an input of selecting one cloud server 2000 from the user.

In operation S445, the mobile device 100 may request the cloud control server 1000 to migrate the virtual machine of the mobile device 100 to the second cloud server 2000*b* selected by the user.

The request for migrating the virtual machine (also referred to as the virtual machine migration request) may include identification information of the second cloud server 2000b selected by the user.

In operation S450, the cloud control server 1000 may request the first cloud server 2000a to migrate the virtual machine of the mobile device 100 to the second cloud server 2000b.

When the cloud control server 1000 receives the virtual machine migration request from the mobile device 100, the cloud control server 1000 may obtain identification information of the first cloud server 2000a storing the virtual machine of the mobile device 100, based on the identification information of the virtual machine.

When the cloud control server 1000 obtains the identification information of the first cloud server 2000a storing the virtual machine of the mobile device 100, the cloud control server 1000 may request the first cloud server 2000a to migrate the virtual machine of the mobile device 100 to the second cloud server 2000b selected by the user.

The request for migrating the virtual machine (also referred to as the virtual machine migration request) that is transmitted to the first cloud server 2000a may include the identification information of the virtual machine and the identification information of the second cloud server 2000b.

In operation S455, the first cloud server 2000a may migrate the virtual machine of the mobile device 100 that was being executed in the first cloud server 2000a to the second cloud server 2000b.

Based on the identification information of the virtual machine, the first cloud server 2000a may identify the migration target virtual machine of the mobile device 100 from among virtual machines stored in the first cloud server 2000a.

When the first cloud server 2000a identifies the virtual machine of the mobile device 100, the first cloud server 2000a may migrate the virtual machine of the mobile device 100 to the second cloud server 2000b. The method of migrating the virtual machine stored in the first cloud server 2000a from the first cloud server 2000a to the second cloud server 2000b may be described with reference to FIG. 3.

In operation S460, the mobile device 100 may execute an application by using a virtual machine in the second cloud server 2000b.

Since the virtual machine of the mobile device 100 is migrated from the first cloud server 2000a to the second cloud server 2000b, the mobile device 100 may execute the application by using the virtual machine in the second cloud server 2000b.

FIG. 5 is a drawing for describing a method of providing a user interface for selecting the cloud server 2000 to which a virtual machine of the mobile device 100 is to be migrated, the method performed by the mobile device 100, according to an exemplary embodiment.

Referring to FIG. 5, the mobile device 100 may display a menu for migrating a location of a virtual machine.

For example, the mobile device 100 may receive, from the cloud server 2000, an execution image of an application executed in the virtual machine of the mobile device 100, and may display the received execution image on a screen of the mobile device 100. When the mobile device 100 receives a user input of inputting a preset key while the application is virtually executed, the mobile device 100 may display a virtual machine migration menu 510 on the displayed execution image.

When the mobile device 100 receives a user input of selecting the virtual machine migration menu 510, the mobile device 100 may request the cloud control server 1000 for information about at least one cloud server 2000 in which the virtual machine of the mobile device 100 may be executed.

FIG. 6A is a drawing for describing a method of providing a user interface for selecting the cloud server 2000 to which a virtual machine of the mobile device 100 is to be migrated, the method performed by the mobile device 100, according to another exemplary embodiment.

Referring to FIG. 6A, the mobile device 100 may display a map 600 whereon areas 610 through 640 in which the cloud servers 2000 capable of executing a virtual machine are located are marked.

For example, the mobile device 100 may receive, from the cloud control server 1000, information about one or more cloud servers 2000 in which the virtual machine of the mobile device 100 may be executed.

The information about the one or more cloud servers 2000 may include identification information about each cloud server 2000, name information about each cloud server 2000, information about a distance between the mobile device 100 and each cloud server 2000, configuration information of a virtual machine providable by each cloud server 2000, computation capability information of the virtual machine providable by each cloud server 2000, and a latency of each cloud server 2000.

Based on location information of each of the one or more cloud servers 2000 received from the cloud control server 1000, the mobile device 100 may display a map image, and may mark locations of the one or more cloud servers 2000 on the displayed map image.

Also, the mobile device 100 may display, on the locations of the one or more cloud servers 2000 on the map image, names of the one or more cloud servers 2000, a plurality of piece of information about distances between the mobile device 100 and the one or more cloud servers 2000, a plurality of piece of computation capability information of the virtual machines providable by the one or more cloud servers 2000, and latencies.

The mobile device 100 may differently display an image 630 indicating a home cloud server 2000 from images 610, 620, and 640 indicating public cloud servers 2000.

The mobile device 100 may display, on the map image, an image 660 indicating a current location of the mobile device 100.

The mobile device 100 may receive a user input of selecting one cloud server 2000 from a user. When the mobile device 100 receives the user input of selecting the one cloud server 2000, the mobile device 100 may request the cloud control server 1000 to migrate the virtual machine of the mobile device 100 to the one cloud server 2000 selected by the user. The request for migrating the virtual machine may include identification information of the one cloud server 2000 selected by the user.

FIG. 6B is a drawing for describing a method of providing a user interface for selecting the cloud server 2000 to which a virtual machine of the mobile device 100 is to be migrated, the method performed by the mobile device 100, according to another exemplary embodiment.

Referring to FIG. 6B, the mobile device 100 may display a map 600 whereon areas 610 through 640 in which the cloud servers 2000 capable of executing a virtual machine are located are marked.

Based on location information of each of the cloud servers 2000 received from the cloud control server 1000, the mobile device 100 may display a map image, and may mark locations of the cloud servers 2000 on the displayed map image.

Also, the mobile device 100 may display names, latencies, charged costs, and battery consumptions of the cloud servers 2000 on the locations of the cloud servers 2000 on the map image. The latencies, the charged costs, and the battery consumptions of the cloud servers 2000 may be calculated by the cloud control server 1000, based on resource information requested by a workload of the mobile device 100, resource information of a virtual machine providable by each of the cloud servers 2000, and a communication speed between the virtual machine and the mobile device 100.

The mobile device 100 may receive a user input of selecting one cloud server 2000 from a user. When the mobile device 100 receives the user input of selecting the one cloud server 2000, the mobile device 100 may request the cloud control server 1000 to migrate the virtual machine of the mobile device 100 to the one cloud server 2000 selected by the user. The request for migrating the virtual machine may include identification information of the one cloud server 2000 selected by the user.

FIG. 7 is a flowchart of a method of determining, based on movement route information of a user of the mobile device 100, the cloud server 2000 to which a virtual machine of the mobile device 100 is to be migrated, the method performed by the cloud control server 1000, according to an exemplary embodiment.

In operation S710, the cloud control server 1000 that controls the cloud servers 2000 may obtain the movement route information of the user of the mobile device 100.

The movement route information of the user may mean information indicating a location of the user according to time. For example, the movement route information of the user may be information indicating the location of the user that changes according to time throughout a day.

In operation S720, the cloud control server 1000 may obtain location information of the mobile device 100.

The cloud control server 1000 may obtain the location information of the mobile device 100 from the mobile device 100. In some embodiments, the cloud control server 1000 may obtain the location information of the mobile device 100 from the cloud server 2000 in which the virtual machine of the mobile device 100 is located.

The location information of the mobile device 100 may include latitude and longitude of the mobile device 100, and address information of the mobile device 100. Also, the location information of the mobile device 100 may include information about a time when the latitude and longitude of the mobile device 100 were measured. Also, the location information of the mobile device 100 may include speed information of the mobile device at each location.

In operation S730, based on the location information of the mobile device 100 and the movement route information of the user, the cloud control server 1000 may determine an estimated route along which the mobile device 100 is to be moved.

For example, based on the location information of the mobile device 100, the cloud control server 1000 may determine a point on a movement route of the user, wherein the point corresponds to a location of the mobile device 100. In a case where the movement route information indicates a movement route of the user according to time, the cloud control server 1000 may determine a movement direction of the mobile device 100, based on a time when the location information of the mobile device 100 was measured.

When the point corresponding to the location of the mobile device 100, and the movement direction of the mobile device 100 are determined, the cloud control server 1000 may calculate the estimated route along which the mobile device 100 is to be moved for a preset time period, based on the movement route information of the user.

In operation S740, based on the estimated route of the mobile device 100, the cloud control server 1000 may determine the cloud server 2000 to which the virtual machine of the mobile device 100 is to be migrated.

The cloud control server 1000 may determine the cloud server 2000 that is located nearest to the estimated route of the mobile device 100 as the cloud server 2000 to which the virtual machine of the mobile device 100 is to be migrated.

Alternatively, the cloud control server 1000 may determine one or more cloud servers 2000 located within a preset distance range from the estimated route of the mobile device 100, and may determine, from among the one or more cloud servers 2000, the cloud server 2000 to which the virtual machine of the mobile device 100 is to be migrated, based on an estimated speed of the mobile device 100, and a computation capability of a virtual machine providable by each of the one or more cloud servers 2000.

In operation S750, the cloud control server 1000 may migrate the virtual machine of the mobile device 100 to the determined cloud server 2000 from the cloud server 2000 in which the virtual machine of the mobile device 100 was being executed and that is from among the one or more cloud servers 2000.

The virtual machine of the mobile device 100 may be a virtual machine that executes an application output from the mobile device 100. The cloud control server 1000 may request the cloud server 2000, in which the virtual machine of the mobile device 100 is being executed, to migrate the virtual machine of the mobile device 100 to the determined cloud server 2000. The method of migrating the virtual machine of the mobile device 100 from the cloud server 2000 in which the virtual machine of the mobile device 100 was being executed to the determined cloud server 2000 may be described with reference to FIG. 3.

In this case, the cloud control server 1000 may determine a time to migrate the virtual machine of the mobile device 100, based on virtual machine use pattern information of the user with respect to the virtual machine of the mobile device 100, and may migrate the virtual machine of the mobile device 100 at the determined time. For example, the cloud control server 1000 may determine a time period in which the user does not use the virtual machine of the mobile device 100 during a preset time period, as the time to migrate the virtual machine of the mobile device 100.

FIG. 8 is a flowchart of a method of determining, based on movement route information of a user of the mobile device 100, the cloud server 2000 to which a virtual machine of the mobile device 100 is to be migrated, the method performed by the cloud control server 1000, according to another exemplary embodiment.

In operation S810, the mobile device 100 may execute an application by using a virtual machine in the first cloud server 2000a.

For example, an actual application and an actual operating system may be executed in the virtual machine in the first cloud server 2000a, and the mobile device 100 may receive an execution result of the virtual machine from the first cloud server 2000a and may output the execution result.

The mobile device 100 may transmit a user input to the first cloud server 2000a. When the user input is received from the mobile device 100, the first cloud server 2000a may execute the application based on the user input, and may transmit the execution result to the mobile device 100.

Accordingly, a user may use the mobile device 100 as if the actual application were being executed in the mobile device 100.

In operation S820, the cloud control server 1000 may obtain the movement route information of the user of the mobile device 100 from the mobile device 100.

The cloud control server 1000 may periodically receive location information of the mobile device 100 from the mobile device 100 for a preset time period, and may generate information about an average movement route of the user, based on the received location information. Also, the cloud control server 1000 may receive the movement route information of the user of the mobile device 100 from the mobile device 100. Also, the cloud control server 1000 may obtain the movement route information of the user of the mobile device 100, based on a user input of setting a movement route.

When the cloud control server 1000 obtains the movement route information of the user, the cloud control server 1000 may store the movement route information of the user in correspondence with identification information of the user.

The movement route information of the user may mean information indicating a location of the user according to time. For example, the movement route information of the user may be information indicating the location of the user that changes according to time throughout a day.

In operation S830, the cloud control server 1000 may request the mobile device 100 for location information of the mobile device 100.

The cloud control server 1000 may determine whether to migrate the virtual machine of the mobile device 100. For example, the cloud control server 1000 may periodically determine whether to migrate the virtual machine of the mobile device 100. Also, when a communication speed between the mobile device 100 and the first cloud server 2000*a* is equal to or less than a threshold value, the cloud control server 1000 may determine whether to migrate the virtual machine of the mobile device 100.

When the cloud control server 1000 determines to migrate the virtual machine of the mobile device 100, the cloud control server 1000 may request the mobile device 100 for the location information of the mobile device 100.

In operation S840, the mobile device 100 may transmit the location information of the mobile device 100 to the cloud control server 1000.

The location information of the mobile device 100 may include latitude, longitude, and an address. Also, the location information of the mobile device 100 may include information about a time when the latitude, the longitude, and the address were measured. Also, the location information of the mobile device 100 may include speed information of the mobile device 100 at each location.

In operation S850, based on the movement route information of the user and the location information of the mobile device 100, the cloud control server 1000 may determine an estimated route along which the mobile device 100 is to be moved.

For example, based on the location information of the mobile device 100, the cloud control server 1000 may determine a point on a movement route of the user, wherein the point corresponds to a location of the mobile device 100. In a case where the movement route information indicates a movement route of the user according to time, the cloud control server 1000 may determine a movement direction of the mobile device 100, based on a time when the location information of the mobile device 100 was measured.

When the point corresponding to the location of the mobile device 100, and the movement direction of the mobile device 100 are determined, the cloud control server 1000 may calculate the estimated route along which the mobile device 100 is to be moved for a preset time period, based on the movement route information of the user.

In operation S860, based on the estimated route of the mobile device 100, the cloud control server 1000 may determine the second cloud server 2000*b* as the cloud server 2000 to which the virtual machine of the mobile device 100 is to be migrated.

The cloud control server 1000 may determine the second cloud server 2000*b* that is the cloud server 2000 located nearest to the estimated route of the mobile device 100, as the cloud server 2000 to which the virtual machine of the mobile device 100 is to be migrated.

Alternatively, the cloud control server 1000 may determine one or more cloud servers 2000 located within a preset distance range from the estimated route of the mobile device 100, and may determine, from among the one or more cloud servers 2000, the second cloud server 2000*b* to which the virtual machine of the mobile device 100 is to be migrated, based on an estimated speed of the mobile device 100, and a computation capability of a virtual machine providable by each of the one or more cloud servers 2000.

In a case where the movement route information of the user includes speed information with respect to a movement route, the cloud control server 1000 may obtain an estimated speed of the mobile device 100 on the movement route, based on the location information of the mobile device 100 and the movement route information of the user.

When the cloud control server 1000 obtains the estimated speed of the mobile device 100, the cloud control server 1000 may determine, based on the estimated speed, the cloud server 2000 as the second cloud server 2000*b* to which the virtual machine of the mobile device 100 is to be migrated, wherein the determined cloud server 2000 is from among the one or more cloud servers 2000 and whose accumulated distances from the mobile device 100 is shortest during a preset time period. That is, the cloud control server 1000 may determine, based on the estimated speed of the mobile device 100, the cloud server 2000 as the second cloud server 2000*b* to which the virtual machine of the mobile device 100 is to be migrated, wherein the determined cloud server 2000 may least cause migration on the estimated route.

Also, for example, the cloud control server 1000 may determine the cloud server 2000 that provides a virtual machine having a highest computation capability and is from among the one or more cloud servers 2000, as the second cloud server 2000*b* to which the virtual machine of the mobile device 100 is to be migrated.

In operation S870, the cloud control server 1000 may request the first cloud server 2000*a* to migrate the virtual machine of the mobile device 100 to the second cloud server 2000*b*.

When the cloud server 100 determines the cloud server 2000 to which the virtual machine of the mobile device 100 is to be migrated, the cloud control server 100 may obtain identification information of the first cloud server 2000*a* in which the virtual machine of the mobile device 100 is stored.

When the cloud control server 100 obtains the identification information of the first cloud server 2000*a* in which the virtual machine of the mobile device 100 is stored, the cloud control server 1000 may request the first cloud server 2000a to migrate the virtual machine of the mobile device 100 to the second cloud server 2000b that is determined in the operation S860. The request for migrating the virtual machine, which is transmitted to the first cloud server 2000a, may include identification information of the virtual machine and identification information of the second cloud server 2000b.

In operation S880, the first cloud server 2000a may migrate the virtual machine of the mobile device 100, which was being executed in the first cloud server 2000a, to the second cloud server 2000b.

Based on the identification information of the virtual machine, the first cloud server 2000a may identify the migration target virtual machine of the mobile device 100 from among virtual machines stored in the first cloud server 2000a.

When the first cloud server 2000a identifies the virtual machine of the mobile device 100, the first cloud server 2000a may migrate the virtual machine of the mobile device 100 to the second cloud server 2000b. The method of migrating the virtual machine stored in the first cloud server 2000a from the first cloud server 2000a to the second cloud server 2000b may be described with reference to FIG. 3.

In operation S890, the mobile device 100 may execute an application by using a virtual machine in the second cloud server 2000b.

Since the virtual machine of the mobile device 100 is migrated from the first cloud server 2000a to the second cloud server 2000b, the mobile device 100 may execute the application by using the virtual machine in the second cloud server 2000b.

FIG. 9 illustrates user's movement route information 900 that is stored in the cloud control server 1000, according to an exemplary embodiment.

Referring to FIG. 9, the user's movement route information 900 may include latitudes 920, longitudes 930, and speeds 940 of the mobile device 100 according to time 910.

The user's movement route information 900 may be statistically calculated. For example, the cloud control server 1000 may receive a plurality of pieces of location information of the mobile device 100 from the mobile device 100 for one month, and may record locations and speeds of the mobile device 100 according to time, based on the plurality of pieces of location information. Based on the locations and the speeds that are recorded for one month, the cloud control server 1000 may calculate user's average movement route information.

The user's movement route information 900 may be stored in the cloud control server 1000, in correspondence with identification information of a user.

FIG. 10 is a drawing for describing a method of determining, based on movement route information of a user, the cloud server 2000 to which a virtual machine of the mobile device 100 is to be migrated, the method performed by the cloud control server 1000, according to another exemplary embodiment.

Referring to FIG. 10, in a case where a current location 1080 of the mobile device 100 is between a Server1 1010 and a Server2 1030, and a time when information about the location 1080 of the mobile device 100 is obtained is 6:50 p.m., the cloud control server 1000 may determine a Server3 1040 as the cloud server 2000 to which the virtual machine of the mobile device 100 is to be migrated.

For example, when a latency between the mobile device 100 and the Server1 1010 is increased, the cloud control server 1000 may request the mobile device 100 for location information of the mobile device 100. The cloud control server 1000 may receive the location information of the mobile device 100 from the mobile device 100.

When the cloud control server 1000 receives the location information of the mobile device 100, the cloud control server 1000 may determine an estimated route along which the mobile device 100 is to be moved, based on the user's movement route information 900 shown in FIG. 9.

For example, based on the movement route information of the user, the cloud control server 1000 may determine the location 1080 that corresponds to a location of the mobile device 100 from among points on a movement route of the user. Also, in a case where the time when the location information of the mobile device 100 is obtained is 6:50 p.m., the cloud control server 1000 may determine a movement direction of the mobile device 100 on the movement route of the user, as a direction in which the mobile device 100 is toward home 1060 from a company 1020.

When the location 1080 that corresponds to the location of the mobile device 100 from among the points on the movement route of the user, and the movement direction of the mobile device 100 are determined, the cloud control server 1000 may determine that the mobile device 100 will be moved east along the movement route of the user.

When the estimated route along which the mobile device 100 is to be moved is determined, the cloud control server 1000 may determine the cloud server 2000 to which the virtual machine of the mobile device 100 is to be migrated.

In consideration of the estimated route and an estimated speed of the mobile device 100, the cloud control server 1000 may determine a cloud server as the cloud server 2000 to which the virtual machine of the mobile device 100 is to be migrated, wherein the cloud server may least cause migration during a unit time period.

For example, the cloud control server 1000 may recognize that the Server2 1030 and the Server3 1040 are positioned within a preset distance from the estimated route of the mobile device 100. Also, based on the user's movement route information 900 shown in FIG. 9, when the mobile device 100 is moved along the estimated route, the cloud control server 1000 may determine that accumulated distances from the mobile device 100 to the Server2 1030 are less than accumulated distances from the mobile device 100 to the Server3 1040. That is, since the mobile device 100 is moved toward the Server3 1040 via the Server2 1030, and a movement speed of the mobile device 100 near the Server2 1030 is faster than a movement speed of the mobile device 100 near the Server3 1040, the cloud control server 1000 may determine that a time period in which the mobile device 100 is closer to the Server3 1040 is longer than a time period in which the mobile device 100 is closer to the Server2 1030 by more than a threshold value.

Therefore, the cloud control server 1000 may determine, from among the Server2 1030 and the Server3 1040, the Server3 1040 as the cloud server 2000 to which the virtual machine of the mobile device 100 is to be migrated, wherein the accumulated distances from the mobile device 100 to the Server3 1040 are shortest during the preset time period.

FIG. 11 is a drawing for describing a method of determining, based on movement route information of a user and a latency, the cloud server 2000 to which a virtual machine of the mobile device 100 is to be migrated, the method performed by the cloud control server 1000, according to another exemplary embodiment.

Referring to FIG. 11, the cloud control server 1000 may determine the cloud server 2000 to which the virtual machine of the mobile device 100 is to be migrated, in consideration of a movement target location of the mobile device 100 and the latency.

For example, when the cloud control server 1000 receives location information of the mobile device 100, the cloud control server 1000 may determine an estimated route along which the mobile device 100 is to be moved, based on the user's movement route information 900 shown in FIG. 9. When the estimated route along which the mobile device 100 is to be moved is determined, the cloud control server 1000 may determine a Server2 1030 or a Server3 1040, as the cloud server 2000 that is located within a preset distance from the estimated route of the mobile device 100.

The latency may indicate a time period from when the mobile device 100 transmits a user input to the cloud server 2000 to when an execution result of a workload processed according to the user input is returned from the cloud server 2000 to the mobile device 1000.

The cloud control server 1000 may calculate an estimated latency on the estimated route, based on a computation capability required for execution of the workload in the virtual machine of the mobile device 100, a computation capability of a virtual machine providable by the cloud server 2000, and a distance between the cloud server 2000 and the estimated route of the mobile device 100. Therefore, based on the calculated latency, the cloud control server 1000 may determine the cloud server 2000 to which the virtual machine of the mobile device 100 is to be migrated.

For example, in a case where the computation capability required for execution of the workload in the virtual machine of the mobile device 100 is 200, the computation capability of a virtual machine providable by the Server2 1030 is 200, and a distance between the Server2 1030 and the estimated route of the mobile device 100 is 10, the cloud control server 1000 may determine that a latency with respect to the Server2 1030 is 10 ms. Also, in a case where the computation capability of a virtual machine providable by the Server3 1040 is 100, and a distance between the Server3 1040 and the estimated route of the mobile device 100 is 10, the cloud control server 1000 may determine that a latency with respect to the Server3 1040 is 20 ms.

Accordingly, the cloud control server 1000 may not determine the Server3 1040 that is closer to the estimated route of the mobile device 100 but may determine the Server2 1030 whose latency is smaller, as the cloud server 2000 to which the virtual machine of the mobile device 100 is to be migrated.

FIG. 12 is a flowchart of a method of migrating a virtual machine of the mobile device 100, based on an estimated route along which the mobile device 100 is to be moved and a virtual machine use pattern of a user, the method performed by the cloud control server 1000, according to an exemplary embodiment.

In operation S1210, the mobile device 1000 may execute an application by using a virtual machine in the first cloud server 2000*a*. In operation S1215, the cloud control server 1000 may obtain movement route information of a user of the mobile device 100 from the mobile device 100. In operation S1220, the cloud control server 1000 may request the mobile device 100 for location information of the mobile device 100. In operation S1225, the mobile device 100 may transmit the location information of the mobile device 100 to the cloud control server 1000. In operation S1230, based on the movement route information of the user and the location information of the mobile device 100, the cloud control server 1000 may determine an estimated route along which the mobile device 100 is to be moved. In operation S1235, based on the estimated route of the mobile device 100, the cloud control server 1000 may determine the second cloud server 2000*b* as the cloud server 2000 to which the virtual machine of the mobile device 100 is to be migrated. Operations S1210 through S1235 may be described with reference to operations S810 through S860 of FIG. 8.

In operation S1240, the cloud control server 1000 may obtain a user's use pattern with respect to the virtual machine of the mobile device 100.

The user's use pattern with respect to the virtual machine may include information indicating a time when the user uses the virtual machine or indicating a location where the user uses the virtual machine.

The cloud control server 1000 may periodically check whether the user uses the virtual machine. Whether the virtual machine is used may be determined based on whether a result of a workload executed in the virtual machine is transmitted to the mobile device 100 or whether a user input is received from the mobile device 100.

The cloud control server 1000 may statistically obtain virtual machine use pattern information of the user, based on a virtual machine use record of the user during a preset time period. Also, the cloud control server 1000 may receive the virtual machine use pattern information of the user from the mobile device 100. Also, the cloud control server 1000 may obtain the virtual machine use pattern information of the user, based on a user input of setting the use pattern with respect to the virtual machine.

The cloud control server 1000 may store the virtual machine use pattern information of the user, in correspondence with identification information of the user.

In operation S1245, based on the user's use pattern with respect to the virtual machine of the mobile device 100, the cloud control server 1000 may determine a time to migrate the virtual machine of the mobile device 100.

The cloud control server 1000 may determine whether a time period or a route where the user does not use the virtual machine during a preset time period on the estimated route of the mobile device 100. The cloud control server 1000 may determine, as a migration point, a start of the time period or the route where the user does not use the virtual machine.

When the migration point is determined, the cloud control server 1000 may determine a time when the mobile device 100 arrives at the migration point as the time to migrate the virtual machine of the mobile device 100.

For example, if the user mainly uses the virtual machine while the user moves, the cloud control server 1000 may determine a home or a workplace as the migration point. If the user mainly uses the virtual machine after the user arrives home or at the workplace, the cloud control server 1000 may determine, as the migration point, a point from which the user exits the home or the workplace.

For example, in a case where the user uses the virtual machine while the user moves by public transportation, and does not use the virtual machine in a transfer area, the cloud control server 1000 may determine the transfer area as the migration point.

In operation S1250, the cloud control server 1000 may request the first cloud server 2000*a* to migrate the virtual machine of the mobile device 100 to the second cloud server 2000*b* at the time determined in the operation S1245.

The cloud control server 1000 may determine whether the mobile device 100 arrived at the migration point. When the mobile device 100 arrives at the migration point, the cloud control server 1000 may request the first cloud server 2000*a* to migrate the virtual machine of the mobile device 100 to the second cloud server 2000*b*.

In operation S1255, the first cloud server 2000a may migrate, to the second cloud server 2000b, the virtual machine of the mobile device 100 that was being executed in the first cloud server 2000a. In operation S1260, the mobile device 100 may execute an application by using the virtual machine in the second cloud server 2000b. Operations S1255 through S1260 may be described with reference to operations S880 through S890 of FIG. 8.

In general, a user experiences a state in which execution of an application is temporally stopped due to downtime that occurs during migration of a virtual machine. However, according to the present exemplary embodiment, since the virtual machine is migrated in a time period during which the user does not use the virtual machine, the user may not experience the state in which execution of the application is temporally stopped while the user uses the mobile device 100.

FIG. 13A illustrates user's virtual machine use pattern information 1310 stored in the cloud control server 1000, according to an exemplary embodiment.

Referring to FIG. 13A, the user's virtual machine use pattern information 1310 (may be information indicating whether a user uses the mobile device 100 by using a virtual machine at a particular time or location.

The user's virtual machine use pattern information 1310 may be statistically calculated. For example, the cloud control server 1000 may record times when or locations where the user uses the virtual machine during one month. Based on the times and locations recorded during one month, the cloud control server 1000 may obtain an average virtual machine use pattern of the user.

The user's virtual machine use pattern information 1310 may be stored in the cloud control server 1000, in correspondence with identification information of the user.

Based on the user's virtual machine use pattern information 1310, the cloud control server 1000 may determine a point or a route of an entire movement route of the user, in which the user does not use the virtual machine.

FIG. 13B is a diagram for describing a method of migrating a virtual machine of the mobile device 100, based on an estimated route along which the mobile device 100 is to be moved and a virtual machine use pattern of a user, the method performed by the cloud control server 1000, according to another exemplary embodiment.

Referring to FIG. 13B, the cloud control server 1000 may migrate the virtual machine of the mobile device 100 at a point of a movement route of the user, in which the user does not use the virtual machine.

For example, when a latency between the mobile device 100 and a Server1 1010 is increased, the cloud control server 1000 may request the mobile device 100 for location information of the mobile device 100. The cloud control server 1000 may receive the location information of the mobile device 100 from the mobile device 100.

When the cloud control server 1000 receives the location information of the mobile device 100, the cloud control server 1000 may determine the movement route of the mobile device 100, based on movement route information of the user shown in FIG. 13A.

For example, based on the movement route information of the user, the cloud control server 1000 may determine a point 1080 that corresponds to a location of the mobile device 100 on the movement route of the user. Also, when a time when the location information of the mobile device 100 is obtained is 6:50 p.m., the cloud control server 1000 may determine a movement direction of the mobile device 100 on the movement route of the user, as a direction in which the mobile device 100 is toward home 1060 from a company 1020. Accordingly, the cloud control server 1000 may determine an estimated route 1410 in which the mobile device 100 is to be moved along a movement route 1090 of the user, from a start that is the point 1080 on the movement route of the user and corresponds to the location of the mobile device 100. Also, based on the estimated route 1410 in which the mobile device 100 is to be moved, the cloud control server 1000 may determine a Server3 1040 as the cloud server 2000 to which the virtual machine of the mobile device 100 is to be migrated.

When the Server3 1040 is determined as the cloud server 2000 to which the virtual machine of the mobile device 100 is to be migrated, the cloud control server 1000 may determine a time to migrate the virtual machine of the mobile device 100.

For example, the cloud control server 1000 may determine whether a time period or a route where the user does not use the virtual machine during a preset time period on the estimated route of the mobile device 100.

For example, based on the user's virtual machine use pattern information 1310 shown in FIG. 13A, the cloud control server 1000 may determine that the user does not use the virtual machine of the mobile device 100 for 5 minutes in a subway transfer area 1420 on the estimated route of the mobile device 100. Accordingly, the cloud control server 1000 may determine, as a migration point, the subway transfer area 1420 on the estimated route of the mobile device 100.

Since the migration point has been determined, when the mobile device 100 arrives at the migration point, the cloud control server 1000 may migrate the virtual machine of the mobile device 100 to the Server3 1040.

FIG. 14A illustrates information about movement routes and virtual machine use patterns of a user stored in the cloud control server 1000, according to another exemplary embodiment.

Referring to FIG. 14A, the movement routes and the virtual machine use patterns of the user may be matched with same times, respectively, and may be stored.

For example, from 8:00 a.m. through 9:00 a.m. that is an attendance time, a movement route of the user and a virtual machine use pattern of the user may be plural in number.

For example, from home to a workplace, the user may move by subway or by shuttle bus. When the user goes to the workplace by subway, the user may use a virtual machine during an attendance time, but when the user goes to the workplace by shuttle bus, the user may not execute a workload, or may not use the virtual machine and may directly execute the workload in the mobile device 100.

Accordingly, the cloud control server 1000 may determine two routes from 8:00 a.m. through 9:00 a.m., and virtual machine use patterns that correspond to the two routes, respectively.

FIG. 14B is a diagram for describing a method of migrating a virtual machine of the mobile device 100, based on an estimated route along which the mobile device 100 is to be moved and a virtual machine use pattern of a user, the method performed by the cloud control server 1000, according to another exemplary embodiment.

Referring to FIG. 14B, based on a movement route and virtual machine use pattern information of the user, the cloud control server 1000 may determine a location of the mobile device 100 whose virtual machine is to be migrated.

For example, the cloud control server 1000 may receive location information of the mobile device 100 and a time when the location information is obtained from the mobile device 100.

Based on movement route information of the user, the cloud control server 1000 may determine a point 1080 that corresponds to a location of the mobile device 100 on the movement route of the user.

Also, based on the location of the mobile device 100 and the time when the location information is obtained, the cloud control server 1000 may determine, as the estimated route, one of a plurality of movement routes that correspond to a time.

For example, referring to FIG. 14A, in a case where the time when the location information is obtained is 8:10 a.m., the cloud control server 1000 may determine a movement direction of the mobile device 100, as a direction in which the mobile device 100 is toward home 1060 from a company 1020. Also, the cloud control server 1000 may determine a subway route from among two movement routes from 8:00 a.m. through 9:00 a.m., as the estimated route of the mobile device 100.

When one of the plurality of movement routes is determined, based on a virtual machine use pattern corresponding to the determined movement route, the cloud control server 1000 may determine the location of the mobile device 100 whose virtual machine is to be migrated.

For example, referring to FIG. 14A, when the user goes to the workplace by subway, the user keeps using the virtual machine while the user moves by subway. Accordingly, the cloud control server 1000 may migrate the virtual machine in a transfer station or at a time when the user arrives at the workplace, since the user does not use the virtual machine in the transfer station or at the time of arrival.

In a case where a movement route of the user involves using a shuttle bus, and a workload of the mobile device 100 is offloaded to the cloud server 2000, the user does not use the virtual machine in the shuttle bus, thus, the cloud control server 1000 may migrate the virtual machine of the mobile device 100 while the user moves by shuttle bus.

FIG. 15 is a diagram for describing a method of migrating a virtual machine between a home cloud server 2000*d* and one of public cloud servers 2000*a* through 2000*c*, when the home cloud server 2000*d* is registered in the cloud control server 1000, according to an exemplary embodiment.

Referring to FIG. 15, the home cloud server 2000*d* may be registered in the cloud control server 1000.

The home cloud server 2000*d* may be a home device including a virtual machine manager that is software or a hardware logic gate capable of managing a virtual machine. For example, the home cloud server 2000*d* may be a tablet person computer (PC) or a smartphone. Also, the home cloud server 2000*d* may be home electronic appliance devices including a smart refrigerator, a smart TV, a robot cleaning machine, etc. For example, the home cloud server 2000*d* may mean a server that controls a home cloud system formed in user's home.

The virtual machine manager in the home cloud server 2000*d* may include a virtualization layer for executing a plurality of operating systems in the home cloud server 2000*d*. For example, the virtualization layer may be implemented by using a hypervisor technique such as KVM or Xen. Also, the virtual machine manager in the home cloud server 2000*d* may include a cloud layer for managing a resource of the home cloud server 2000*d* or managing a virtual machine. For example, the cloud layer may be implanted by using a cloud technique such as Openstack or Cloudstack.

The cloud control server 1000 may provide a user interface for registering the home cloud server 2000*d*. The user interface for registering the home cloud server 2000*d* may include a user interface for receiving an input of user information and information about the home cloud server 2000*d*.

The information about the home cloud server 2000*d* may include identification information of the home cloud server 2000*d*, configuration information of a virtual machine providable by the home cloud server 2000*d*, location information of the home cloud server 2000*d*, and link information of the home cloud server 2000*d*. The link information of the home cloud server 2000*d* may include a uniform resource locator (URL) address of the home cloud server 2000*d*.

When a user input of registering the home cloud server 2000*d* is received, the cloud control server 1000 may store the information about the home cloud server 2000*d*, based on account information of the user stored in the cloud control server 1000.

When the home cloud server 2000*d* is registered in the cloud control server 1000, the cloud control server 1000 may receive, from the home cloud server 2000*d*, information about a virtual machine that is being executed in the home cloud server 2000*d*.

Also, the cloud control server 1000 may control the home cloud server 2000*d* and the one of the public cloud servers 2000*a* through 2000*c* so as to make a virtual machine to be migrated between the home cloud server 2000*d* and the one of the public cloud servers 2000*a* through 2000*c*.

The cloud control server 1000 may receive location information of the mobile device 100 from the mobile device 100 or the home cloud server 2000*d*, and may determine whether the mobile device 100 entered a home zone or exited the home zone. When the home cloud server 2000*d* is located within the user's home, the home zone may indicate an area within a preset distance from a location of the home cloud server 2000*d*. Also, the home zone may indicate a range in which the home electronic appliance devices or various sensors in the user's home may recognize the mobile device 100 via a short-distance network.

For example, the cloud control server 1000 may receive the location information of the mobile device 100 from the mobile device 100, and may determine whether the mobile device 100 entered the home zone, based on the location information. The location information of the mobile device 100 may be obtained by using a location information sensor such as a global positioning system (GPS) in the mobile device 100. Also, for example, the cloud control server 1000 may receive, from the mobile device 100, information indicating that the mobile device 100 entered the home zone or exited the home zone.

Alternatively, the cloud control server 1000 may receive, from the home cloud server 2000*d*, information indicating that the mobile device 100 entered the home zone or exited the home zone. The home cloud server 2000*d* may determine whether the mobile device 100 entered the home zone or exited the home zone, by using a sensor or a device in the home cloud system. For example, in a case where the mobile device 100 is connected to a wireless network device in the home cloud system, the home cloud server 2000*d* or the mobile device 100 may determine that the mobile device 100 entered the home zone. In a case where connection between the mobile device 100 and the wireless network device in the home cloud system is disconnected, the home cloud server 2000*d* or the mobile device 100 may determine that the mobile device 100 exited the home zone. For example, when identification information of a radio frequency identification (RFID) tag arranged in the mobile device 100 is received from an RFID sensor in the home cloud system, the home cloud server 2000*d* may determine that the mobile device 100 entered the home zone.

When the mobile device 100 enters the home zone, the cloud control server 1000 may migrate a virtual machine of the mobile device 100 to the home cloud server 2000*d* from the one of the public cloud servers 2000*a* through 2000*c* in which the virtual machine of the mobile device 100 was being executed. When the mobile device 100 exits the home zone, the cloud control server 1000 may migrate the virtual machine of the mobile device 100 to the one of the public cloud servers 2000*a* through 2000*c* from the home cloud server 2000*d* in which the virtual machine of the mobile device 100 was being executed.

FIG. 16 is a diagram for describing a method of executing a virtual machine by using a home cloud system, the method performed by the home cloud server 2000*d*, according to an exemplary embodiment.

Referring to FIG. 16, the home cloud server 2000*d* may indicate a server that controls the home cloud system formed in user's home. For example, the home cloud system may indicate a system formed in a manner that home electronic appliance devices 300, 400, 500, and 700 and a sensor 600 in the user's home are connected via a network. The home cloud system may indicate a system formed in a manner that digital living network alliance (DLNA)-based media devices are connected via Wi-Fi. The home electronic appliance devices 300, 400, 500, and 700 may be connected via a wired network such as Ethernet, power line communication (PLC), IEEE1394, HomePNA, an optical home local area network (LAN), etc. or via a wireless network such as ZigBee, ultra-wideband (UWB), Wireless1394, WirelessUSB, etc. In some embodiments, the home cloud system may be referred to as the home network.

Accordingly, the home cloud server 2000*d* may execute the virtual machine by using resources of the home electronic appliance devices 300, 400, 500, and 700 connected via the network.

For example, the home cloud server 2000*d* may implement a CPU of the virtual machine by multiplexing a CPU of the home electronic appliance device 300 that is a desktop computer. Also, the home cloud server 2000*d* may load the virtual machine to a memory included in a set-top box of a TV that is the home electronic appliance device 400.

The home cloud server 2000*d* may provide an input device for receiving a user input or output devices for providing information to a user, as an input/output (I/O) device of the virtual machine.

For example, the home cloud server 2000*d* may output an execution result of the virtual machine to a screen of the TV 400 in the home cloud system. Also, the home cloud server 2000*d* may receive a user input via a keyboard of the desktop computer 300.

FIG. 17 illustrates a user interface that is displayed on a screen of the mobile device 100 when the mobile device 100 enters a home zone, according to an exemplary embodiment.

Referring to FIG. 17, when a user executes a game application in the mobile device 100, one of the public cloud servers 2000*a* through 2000*c* may execute the game application in a virtual machine, and may transmit an execution result to the mobile device 100. The mobile device 100 may receive a game execution image 1710 from the one of the public cloud servers 2000*a* through 2000*c*, and may display the received game execution image 1710 on its screen.

When the mobile device 100 enters the home zone, the mobile device 100 may determine that the mobile device 100 has entered the home zone. Alternatively, the mobile device 100 may receive, from the home cloud server 2000*d* or the cloud control server 1000, information indicating that the mobile device 100 has entered the home zone.

When the mobile device 100 determines that the mobile device 100 has entered the home zone, the mobile device 100 may display, on the game execution image 1710, a user interface 1720 for migrating the virtual machine of the mobile device 100 that was being executed in the one of the public cloud servers 2000*a* through 2000*c* to the home cloud server 2000*d*.

When the mobile device 100 receives a user input of selecting the user interface 1720 for migrating the virtual machine of the mobile device 100 to the home cloud server 2000*d*, the mobile device 100 may request the cloud control server 1000 to migrate the virtual machine of the mobile device 100 that was being executed in the one of the public cloud servers 2000*a* through 2000*c* to the home cloud server 2000*d*.

FIG. 18 is a diagram for describing a method of displaying a user interface for receiving an input of selecting a device in a home cloud system, the method performed by the mobile device 100, according to an exemplary embodiment.

Referring to (a) of FIG. 18, the mobile device 100 may display a user interface 1810 for receiving an input of selecting a device in a home cloud system.

The user interface 1810 for receiving an input of selecting a device in the home cloud system may include an image showing I/O devices that are registered in the home cloud system and are within the home cloud system. For example, the I/O devices in the home cloud system may include a desktop computer, a TV, a keyboard, an audio device, etc.

When the mobile device 100 receives a user input of selecting one of the I/O devices displayed on a screen of the mobile device 100, the mobile device 100 may transmit identification information of the selected I/O device to the home cloud server 2000*d*.

The home cloud server 2000*d* may determine the I/O device selected by a user, as an I/O device of a virtual machine executed in the home cloud server 2000*d*. Therefore, the home cloud server 2000*d* may output an execution result of the virtual machine to the selected I/O device. Also, the home cloud server 2000*d* may execute the virtual machine, based on a user input that is received from the selected I/O device.

For example, when the home cloud server 2000*d* receives a user input of selecting the TV from among the I/O devices displayed on the screen of the mobile device 100, the home cloud server 2000*d* may change the I/O device of the virtual machine to the TV. When the I/O device of the virtual machine is changed to the TV, the home cloud server 2000*d* may output the execution result of the virtual machine to a screen of the TV.

FIG. 19 is a block diagram of the cloud control server 1000, according to an exemplary embodiment.

As illustrated in FIG. 19, the cloud control server 1000 may include a controller 1110 (also, referred to as the processor 1110), a communication unit 1200, and a storage unit 1300. However, not all elements shown in FIG. 19 are necessary elements of the cloud control server 1000. That is, the cloud control server 1000 may be embodied with more or less elements than the elements shown in FIG. 19.

The communication unit 1200 may transmit information about one or more cloud servers 2000 from among the cloud servers 2000 to the mobile device 100, and may receive, from the mobile device 100, identification information of the cloud server 2000 that is selected from among the one or more cloud servers 2000 by a user of the mobile device 100.

Also, the communication unit 1200 may receive, from the mobile device 100, a request for information about one or more cloud servers 2000 capable of providing virtual machines. When the communication unit 1200 receives the request, the communication unit 1200 may transmit information about the one or more cloud servers 2000 to the mobile device 100.

The communication unit 1200 may obtain location information of the mobile device 100, may determine, based on the location information of the mobile device 100, one or more cloud servers 2000 that are located within a preset distance from a location of the mobile device 100, and may transmit information about the one or more cloud servers 2000 to the mobile device 100.

The communication unit 1200 may determine, based on a computation capability for executing an application, one or more cloud servers 2000 capable of providing virtual machines having the computation capability, and may transmit information about the one or more cloud servers 2000 to the mobile device 100.

The controller 1110 may migrate a virtual machine of the mobile device 100 from the cloud server 2000 in which the virtual machine is positioned to the selected cloud server 2000 from among the one or more cloud servers 2000.

The communication unit 1200 of the cloud control server 1000 that controls the cloud servers 2000 may obtain movement route information of the user of the mobile device 100 and the location information of the mobile device 100.

The controller 1110 may determine an estimated route along which the mobile device 100 is to be moved, based on the movement route information of the user and the location information of the mobile device 100, may determine the cloud server 2000 to which the virtual machine of the mobile device 100 is to be migrated, based on the estimated route of the mobile device 100, and may migrate the virtual machine of the mobile device 100 to the determined cloud server 2000 from the cloud server 2000 that is from among the cloud servers 2000 and in which the virtual machine of the mobile device 100 was being executed.

The controller 1110 may determine one or more cloud servers 2000 located within a preset distance from the estimated route of the mobile device 100, and based on an estimated speed of the mobile device 100, may determine, from among the one or more cloud servers 2000, the cloud server 2000 whose accumulated distances from the mobile device 100 is shortest during a preset time period, as the cloud server 2000 to which the virtual machine of the mobile device 100 is to be migrated.

The controller 1110 may determine the one or more cloud servers 2000 located within the preset distance from the estimated route of the mobile device 100, and may determine, from among the one or more cloud servers 2000, the cloud server 2000 providing a virtual machine with a highest computation capability, as the cloud server 2000 to which the virtual machine of the mobile device 100 is to be migrated.

The controller 1110 may obtain virtual machine use pattern information of the user with respect to the virtual machine of the mobile device 100, may determine a time to migrate the virtual machine of the mobile device 100, based on the virtual machine use pattern information, and may migrate the virtual machine of the mobile device 100 at the determined time.

Also, based on the virtual machine use pattern information, the controller 1110 may determine a time period in which the user does not use the virtual machine of the mobile device 100 during a preset time period, as the time to migrate the virtual machine of the mobile device 100, and may migrate the virtual machine of the mobile device 100 at the determined time. The storage unit 1300 may store information for migrating the virtual machine. Also, the storage unit 1300 may include a cloud server information database (DB) 1330 and a user DB 1320.

The cloud server information DB 1330 may be a DB that stores a plurality of pieces of information about the cloud servers 2000 controlled by the cloud control server 1000. For example, the cloud server information DB 1330 may store identification information of each cloud server 2000, link information of each cloud server 2000, configuration information of a virtual machine providable by each cloud server 2000, computation capability information of the virtual machine providable by each cloud server 2000, or the like. Also, the cloud server information DB 1330 may store not only information about the public cloud server 2000 but may also store information about the home cloud server 2000 in correspondence with identification information of the user.

The user DB 1320 may be a DB that stores information about the user registered in the cloud control server 1000. For example, the user DB 1320 may store identification information of the user registered in the cloud control server 1000, identification information of the mobile device 100 that is stored in correspondence with the identification information of the user, information about the virtual machine of the mobile device 100 that is stored in correspondence with the identification information of the user, or the like.

FIG. 20 is a block diagram illustrating a configuration of the mobile device 100, according to an exemplary embodiment.

As illustrated in FIG. 20, a configuration of the mobile device 100 may be applied to various types of a device such as a mobile phone, a tablet PC, a personal digital assistant (PDA), an MP3 player, a kiosk, an electronic photoframe, a navigation device, a digital TV, a smart watch, a wristwatch, or a wearable device such as smart glasses, head-mounted display (HMD), or the like.

Referring to FIG. 20, the mobile device 100 may include at least one of a display unit 110, a control unit 170, a memory 120, a GPS chip 125, a communication unit 130, a video processor 135, an audio processor 140, a user input unit 145, a microphone unit 150, an image-capturing unit 155, a speaker unit 160, and a motion detecting unit 165.

When a virtual machine of the mobile device 100 in the cloud server 2000 is executed, the display unit 110 may display an execution image of a workload received from the cloud server 2000. Also, the display unit 110 may display a user interface for requesting migration of the virtual machine of the mobile device 100 between the cloud server 2000 and another cloud server 2000.

The display unit 110 may include a display panel 111 and a controller (not shown) that controls the display panel 111. The display panel 111 may be embodied as various displays including an LCD, an organic light-emitting diode (OLED) display, an active matrix OLED (AMOLED) display, a plasma display panel (PDP), or the like. The display panel 111 may be formed to be flexible, transparent, and/or wearable. The display panel 111 may be combined with a touch panel 147 of the user input unit 145, and thus may be provided as a touchscreen (not shown). For example, the touchscreen may include an integrated module having a stack structure containing the display panel 111 and the touch panel 147.

The memory 120 may include at least one of an internal memory (not shown) and an external memory (not shown).

The internal memory may include at least one of a volatile memory (e.g., a dynamic random-access memory (DRAM), a static RAM (SRAM), a synchronous dynamic RAM (SDRAM), etc.), a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD). According to the present exemplary embodiment, the control unit 170 may load a command or data, which is received from at least one of the non-volatile memory and another element, to the volatile memory, and may process the command or the data. Also, the control unit 170 may store, in the non-volatile memory, data that is received from or is generated by another element.

The external memory may include at least one of a compact flash (CF) memory, a secure digital (SD) memory, a micro secure digital (micro-SD) memory, a mini secure digital (mini-SD) memory, an extreme digital (xD) memory, and a memory stick.

The memory 120 may store various programs and data used in operations of the mobile device 100. For example, the memory 120 may temporarily or semi-permanently store a portion of contents to be displayed on a lock screen.

The control unit 170 may control the display unit 110 to display a portion of contents which is stored in the memory 120. In other words, the control unit 170 may display, on the display unit 110, the portion of the contents which is stored in the memory 120. Alternatively, when a user's gesture is performed in a region of the display unit 110, the control unit 170 may perform a control operation that corresponds to the user's gesture.

The control unit 170 may include at least one of a RAM 171, a read-only memory (ROM) 172, a CPU 173, a GPU 174, and a bus 175. The RAM 171, the ROM 172, the CPU 173, and the GPU 174 may be connected to each other via the bus 175. For example, the controller 170 may include only the CPU 173 or, only CPU 173 and the GPU 174.

The CPU 173 may access the memory 120, and performs a booting operation by using an operating system stored in the memory 120. Also, the CPU 173 performs various operations by using the various programs, a plurality of contents, a plurality of pieces of data, etc. stored in the memory 120.

The ROM 172 stores a command set for booting up a system. For example, when a turn-on command is input to the mobile device 100, and power is supplied to the mobile device 100, the CPU 173 may copy the operating system stored in the memory 120 to the RAM 171, according to the command stored in the ROM 172, may execute the operating system, and thus may boot up the system.

Also, the memory 120 may store at least one program for performing various embodiments of the present disclosure. The controller 170 may control the first device 100 to operate according to the various embodiments of the present disclosure by executing the at least one program stored in the memory 120. For example, the CPU 173 may copy the at least one programs stored in the memory 120 to the RAM 171, and performs the various operations by executing the programs copied to the RAM 171. When the mobile device 100 is booted up, the GPU 174 may display a user interface screen in a region of the display unit 110. In more detail, the GPU 174 may generate a screen that displays an electronic document including various objects such as content, an icon, a menu, or the like. The GPU 174 calculates coordinate values of the objects that are to be displayed according to a layout of the user interface screen, and calculates attribute values of shapes, sizes, or colors of the objects. Then, the GPU 174 may generate user interface screens with various layouts including the objects based on the calculated attribute values. The user interface screen generated by the GPU 174 may be provided to the display unit 110 and thus may be displayed in regions of the display unit 110.

The GPS chip 125 may receive a GPS signal from a GPS satellite and may calculate a current position of the mobile device 100. In a case where a navigation program is used or a current position of the user is required, the control unit 170 may calculate a position of the user by using the GPS chip 125.

The communication unit 130 may perform communication with various external devices according to various types of communication methods. The communication unit 130 may include at least one selected from a Wi-Fi chip 131, a Bluetooth chip 132, a wireless communication chip 133, and a near field communication (NFC) chip 134. The control unit 170 may perform the communication with the various external devices by using the communication unit 130.

The Wi-Fi chip 131 and the Bluetooth chip 132 may perform communication by using WiFi and Bluetooth, respectively. If the Wi-Fi chip 131 or the Bluetooth chip 132 is used, the WiFi chip 131 or the Bluetooth chip 132 may first transmit and receive various types of connection information including a service set identification (SSID), a session key, or the like, may establish a connection for communication by using the connection information, and then may transmit and receive various types of information. The wireless communication chip 133 may indicate a chip that performs communication according to various communication standards such as the Institute of Electrical and Electronics Engineers (IEEE), ZigBee, 3rd generation (3G), 3rd Generation Partnership Project (3GPP), Long Term Evolution (LTE), or the like. The NFC chip 134 indicates a chip that operates in using NFC by using a 13.56 MHz band from among various radio frequency-identification (RF-ID) frequency bands such as 135 kHz, 13.56 MHz, 433 MHz, 860 through 960 MHz, 2.45 GHz, or the like.

The video processor 135 may process video data included in content received by using the communication unit 130 or may process video data included in content stored in the memory 120. The video processor 135 may perform various image processing such as decoding, scaling, noise filtering, frame rate conversion, resolution conversion, or the like on the video data.

The audio processor 140 may process audio data included in content received by using the communication unit 130 or may process audio data included in content stored in the memory 120. The audio processor 140 may perform various processing such as decoding, amplification, noise filtering, or the like on the audio data.

When a reproducing program for multimedia content is executed, the control unit 170 may reproduce the multimedia content by driving the video processor 135 and the audio processor 140. The speaker unit 160 may output audio data generated in the audio processor 140.

The user input unit 145 may receive an input of various instructions from a user. The user input unit 145 may include at least one selected from a key 146, a touch panel 147, and a pen recognizing panel 148.

The key 146 may be of various types such as a mechanical button, a wheel, or the like that may be formed in a front portion, a side portion, a rear portion, etc., of an external surface of a body of the mobile device 100.

The touch panel 147 may sense a touch input by the user and may output a value of a touch event that corresponds to a signal generated by the sensed touch input. When the touch panel 147 is combined with the display panel 111 and thus is formed as a touchscreen, the touchscreen may be configured as a capacitive touchscreen, a resistive touchscreen, or a piezoelectric touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen which causes upper and lower plates of a touched point to contact each other. The touch event that occurs on the touchscreen may be mainly generated by a finger of a person but may also be generated by an object formed of a conductive material capable of changing capacitance.

The pen recognizing panel 148 may sense a proximity input or a touch input of a touch pen (e.g., a stylus pen or a digitizer pen) which is performed by a user, and may output a sensed pen proximity event or a sensed pen touch event. The pen recognizing panel 148 may be an electromagnetic resonance (EMR)-type pen recognizing panel, and may sense the touch input or the proximity input according to changes in a strength of an electromagnetic field, which occur when the touch pen approaches or touches the touchscreen. In more detail, the pen recognizing panel 148 may include an electromagnetic induction coil sensor (not shown) having a grid structure, and an electric signal processor (not shown) for sequentially providing an alternating current (AC) signal having a predetermined frequency to each loop coil of the electromagnetic induction coil sensor. When a pen having an internal resonance circuit is positioned near a loop coil of the pen recognizing panel 148, a magnetic field transmitted from the loop coil generates a current in the resonance circuit in the pen, based on mutual electrostatic induction. Due to the current, an induction field is generated from a coil forming the resonance circuit in the pen, and the pen recognizing panel 148 detects the induction field from the loop coil capable of receiving a signal, and thus senses the touch input or the proximity input by the pen. The pen recognizing panel 148 may be arranged to occupy a preset area below the display panel 111, e.g., may have a size capable of covering a display region of the display panel 111.

The microphone unit 150 may receive an input of a user's voice or other sound and may convert the user's voice or other sound to audio data. The control unit 170 may use the user's voice, which is input via the microphone unit 150, in a call-related operation or may convert the user's voice to the audio data and may store the audio data in the memory 120.

The image-capturing unit 155 may capture a still image or a moving picture according to a control by the user. The image-capturing unit 155 may be plural in number and include a front camera, a rear camera, or the like.

If the image-capturing unit 155 and the microphone unit 150 are formed, the control unit 170 may perform a control operation according to a user's voice input via the microphone unit 150 or a user's motion recognized by the image-capturing unit 155. For example, the mobile device 100 may operate in a motion control mode or a voice control mode. If the mobile device 100 operates in the motion control mode, the control unit 170 may activate the image-capturing unit 155 and may capture an image of the user, may trace a change in motions of the user, and may perform a control operation corresponding thereto. If the mobile device 100 operates in the voice control mode (i.e., a voice recognition mode), the control unit 170 may analyze a user's voice input via the microphone unit 150, and may perform a control operation according to the analyzed user's voice.

The motion detecting unit 165 may detect movement of a body of the mobile device 100. The mobile device 100 may rotate or may tilt in various directions. Here, the motion detecting unit 165 may detect a movement characteristic such as a rotation direction, a rotation angle, a tilted angle, or the like by using at least one of various sensors including a magnetic sensor, a gyroscope sensor, an acceleration sensor, etc.

Although not illustrated in FIG. 20, the present exemplary embodiment may further include a universal serial bus (USB) port for connecting the mobile device 100 and a USB connector, various external input ports including a headset, a mouse, a LAN, etc. for connection with various external terminals, a digital multimedia broadcasting (DMB) chip for receiving and processing a DMB signal, various sensors, or the like.

Names of the elements of the mobile device 100 may be changed. Also, the mobile device 100 according to the present exemplary embodiment may be embodied by including at least one of the elements, or may be embodied with more or less elements than the elements.

The one or more exemplary embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art. For example, configuring elements that are singular forms may be executed in a distributed fashion, and also, configuring elements that are distributed may be combined and then executed.

While one or more exemplary embodiments have been described with reference to the figures, it will be understood by those of ordinary skill in the art that various changes in form and details may be made therein without departing from the spirit and scope as defined by the following claims.

The invention claimed is:

1. A cloud control server that controls a plurality of cloud servers, the cloud control server comprising:
   a communication unit comprising circuitry; and
   a controller configured to:
      obtain a location of a mobile device and determine two or more cloud servers from among the plurality of cloud servers that are located within a preset distance from the location of the mobile device,
      transmit, through the communication unit to the mobile device, performance information about the two or more cloud servers from among the plurality of cloud servers, wherein the performance information comprises estimated battery consumption to be utilized by the mobile device when using each of the two or more cloud servers, and
      receive, through the communication unit from the mobile device, identification information of a cloud server that is selected based on an input, from a user of the mobile device for selecting the cloud server from among the two or more cloud servers, and
      migrate a virtual machine serving the mobile device to the selected cloud server from a cloud server in which the virtual machine serving the mobile device is located and that is from among the plurality of cloud servers, based on the received identification information from the mobile device,
   wherein the virtual machine serving the mobile device executes an application that is output from the mobile device.

2. The cloud control server of claim 1, wherein the performance information about the two or more cloud servers further comprises at least one of configuration information of a virtual machine providable by each of the two or more cloud servers, or computation capability information of the virtual machine providable by each of the two or more cloud servers.

3. The cloud control server of claim 1, wherein the controller is further configured to receive, through the communication unit from the mobile device, a request for additional information about at least one of the two or more cloud servers capable of providing the virtual machine, and to transmit the additional information about the at least one of the two or more cloud servers to the mobile device when the request is received.

4. The cloud control server of claim 1, wherein the controller is further configured to determine, based on a computation capability for executing the application, one or more cloud servers capable of providing the virtual machine having the computation capability, and to transmit, via the communication unit, information about the one or more cloud servers to the mobile device.

5. A cloud control server that controls a plurality of cloud servers, the cloud control server comprising:
   a communication unit comprising circuitry; and
   a controller configured to:
      obtain movement route information of a user of a mobile device and current location information of the mobile device,
      determine an estimated route along which the mobile device is to be moved, based on the current location information and the movement route information of the user of the mobile device,
      determine a cloud server to which a virtual machine serving the mobile device is to be migrated, based on the estimated route along which the mobile device is to be moved and estimated battery consumption to be utilized by the mobile device when using the cloud server, and
      migrate the virtual machine serving the mobile device to the determined cloud server from a cloud server in which the virtual machine serving the mobile device was being executed and that is from among the plurality of cloud servers,
   wherein the virtual machine serving the mobile device executes an application that is output from the mobile device,
   wherein the movement route information is generated based on the location information, and the location information is periodically received from the mobile device.

6. The cloud control server of claim 5, wherein the estimated route of the mobile device comprises an estimated speed of the mobile device on the estimated route, and
   the controller is further configured to determine one or more cloud servers located within a preset distance from the estimated route of the mobile device, and to determine, based on the estimated speed of the mobile device, a cloud server that is from among the one or more cloud servers and to which the virtual machine serving the mobile device is to be migrated.

7. The cloud control server of claim 5, wherein the controller is further configured to determine one or more cloud servers located within a preset distance from the estimated route of the mobile device, and to determine a cloud server that provides a virtual machine having a highest computation capability from among the one or more cloud servers, as the cloud server to which the virtual machine serving the mobile device is to be migrated.

8. The cloud control server of claim 5, wherein the controller is further configured to obtain use pattern information of the user with respect to the virtual machine serving the mobile device, to determine, based on the use pattern information, a time to migrate the virtual machine serving the mobile device, and to migrate the virtual machine serving the mobile device at the determined time.

9. The cloud control server of claim 8, wherein the controller is further configured to determine, based on the use pattern information, a time period in which the user does not use the virtual machine serving the mobile device during a preset time period, as the time to migrate the virtual machine serving the mobile device, and to migrate the virtual machine serving the mobile device during the determined time period.

10. A method of migrating a virtual machine, the method performed by a cloud control server that controls a plurality of cloud servers, and comprising:
   obtaining a location of a mobile device and determining two or more cloud servers from among the plurality of cloud servers that are located within a preset distance from the location of the mobile device;
   transmitting, to the mobile device, performance information about the two or more cloud servers from among the plurality of cloud servers, wherein the performance information comprises estimated battery consumption to be utilized by the mobile device when using each of the two or more cloud servers;
   receiving, from the mobile device, identification information of a cloud server that is selected based on an input, from a user of the mobile device for selecting the cloud server from among the two or more cloud servers; and migrating a virtual machine serving the mobile device to the selected cloud server from a cloud server in which the virtual machine serving the mobile device is located and that is from among the plurality of cloud servers, based on the received identification information from the mobile device, wherein the virtual machine serving the mobile device executes an application that is output from the mobile device.

11. The method of claim 10, wherein the performance information about the two or more cloud servers further comprises at least one of configuration information of a virtual machine providable by each of the two or more cloud servers, or computation capability information of the virtual machine providable by each of the two or more cloud servers.

12. The method of claim 10, wherein the transmitting of the performance information comprises:

receiving, from the mobile device, a request for additional information about at least one of the two or more cloud servers capable of providing the virtual machine; and when the request is received, transmitting the additional information about the at least one of the two or more cloud servers to the mobile device.

13. The method of claim 10, wherein the transmitting of the performance information comprises:

determining, based on a computation capability for executing the application, one or more cloud servers capable of providing the virtual machine having the computation capability; and transmitting information about the one or more cloud servers to the mobile device.

14. A non-transitory computer-readable recording medium having recorded thereon a program for executing the method of claim 10, by using a computer.

* * * * *